United States Patent
Kitamori et al.

(10) Patent No.: US 11,511,323 B2
(45) Date of Patent: Nov. 29, 2022

(54) VIBRATION DEVICE AND OPTICAL DETECTION DEVICE

(71) Applicant: Murata Manufacturing Co., Ltd., Nagaokakyo (JP)

(72) Inventors: Nobumasa Kitamori, Nagaokakyo (JP); Hitoshi Sakaguchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 340 days.

(21) Appl. No.: 16/817,677

(22) Filed: Mar. 13, 2020

(65) Prior Publication Data
US 2020/0338607 A1 Oct. 29, 2020

(30) Foreign Application Priority Data

Apr. 25, 2019 (JP) .............................. JP2019-083863

(51) Int. Cl.
| | |
|---|---|
| *B08B 7/02* | (2006.01) |
| *G02B 27/00* | (2006.01) |
| *G03B 17/02* | (2021.01) |
| *G03B 17/08* | (2021.01) |
| *H04N 5/225* | (2006.01) |

(Continued)

(52) U.S. Cl.
CPC .............. *B08B 7/02* (2013.01); *B06B 1/0207* (2013.01); *B06B 1/0651* (2013.01); *B08B 7/04* (2013.01); *G02B 27/0006* (2013.01); *G03B 17/02* (2013.01); *G03B 17/08* (2013.01); *H04N 5/22521* (2018.08); *B06B 1/06* (2013.01); *G03B 2205/0061* (2013.01)

(58) Field of Classification Search
CPC ....... B06B 1/0207; B06B 1/0651; B06B 1/06; G02B 27/0006; B08B 7/02; B08B 7/04; H04N 5/22521; G03B 17/08; G03B 2205/0061; G03B 17/02; G03B 17/00
USPC ........................................................ 359/507
See application file for complete search history.

(56) References Cited

U.S. PATENT DOCUMENTS 8,599,302 B2 * 12/2013 Kawai ..................... B08B 7/02
348/340
2003/0202114 A1 10/2003 Takizawa et al.
(Continued)

FOREIGN PATENT DOCUMENTS

EP 1357740 A1 * 10/2002 ............. H04N 5/225
EP 1 357 740 A1 10/2003
(Continued)

OTHER PUBLICATIONS

Official Communication issued in corresponding European Patent Application No. 20167957.8, dated Sep. 22, 2020.
(Continued)

*Primary Examiner* — Clayton E. LaBalle
*Assistant Examiner* — Kevin C Butler
(74) *Attorney, Agent, or Firm* — Keating & Bennett, LLP

(57) ABSTRACT

A vibration device includes a vibrator including a cylinder including an opening, a light-transmissive cover directly or indirectly coupled to the cylinder to cover the opening of the cylinder, and a piezoelectric element to vibrate the light-transmissive cover, and including an opening end portion, an elastic member holding the opening end portion of the vibrator, and a case connected to the elastic member.

27 Claims, 18 Drawing Sheets

(51) Int. Cl.
　　　*B06B 1/06* (2006.01)
　　　*B08B 7/04* (2006.01)
　　　*B06B 1/02* (2006.01)

(56) References Cited

U.S. PATENT DOCUMENTS

| | | | |
|---|---|---|---|
| 2012/0243093 A1 | 9/2012 | Tonar et al. | |
| 2017/0371154 A1* | 12/2017 | Fedigan | G02B 17/0006 359/507 |
| 2020/0055087 A1 | 2/2020 | Fujimoto et al. | |
| 2020/0338607 A1* | 10/2020 | Kitamori | H04N 5/22521 |
| 2020/0406298 A1* | 12/2020 | Fujimoto | B06B 1/0207 |
| 2021/0302723 A1* | 9/2021 | Fujimoto | B08B 7/02 |
| 2021/0360134 A1* | 11/2021 | Kitamori | H02N 2/0085 |

FOREIGN PATENT DOCUMENTS

| | | | | |
|---|---|---|---|---|
| EP | 3618415 A1 | * | 3/2020 | ............... B08B 3/12 |
| EP | 3731014 A1 | * | 10/2020 | ............... B08B 7/02 |
| JP | 2000-196932 A | | 7/2000 | |
| JP | 2004-200911 A | | 7/2004 | |
| JP | 2017-170303 A | | 9/2017 | |
| WO | 2018/207395 A1 | | 11/2018 | |
| WO | WO-2018207395 A1 | * | 11/2018 | ........... B06B 1/0648 |
| WO | WO-2021192387 A1 | * | 9/2021 | ........... B06B 1/0207 |

OTHER PUBLICATIONS

Official Communication issued in corresponding Japanese Patent Application No. 2019-083863, dated Oct. 5, 2021.
First Office Action in EP20167957.8, dated Jun. 2, 2022, 6 pages.

* cited by examiner

VIBRATION DEVICE AND OPTICAL DETECTION DEVICE

CROSS REFERENCE TO RELATED APPLICATIONS

This application claims the benefit of priority to Japanese Patent Application No. 2019-083863 filed on Apr. 25, 2019. The entire contents of this application are hereby incorporated herein by reference.

BACKGROUND OF THE INVENTION

1. Field of the Invention

The present invention relates to a vibration device and an optical detection device capable of removing water droplets or the like by mechanical vibration.

2. Description of the Related Art

In the past, an imaging device such as a camera used as a monitoring device is required to always clear a field of view thereof. In particular, there have been proposed various mechanisms for removing water droplets such as raindrops, for cameras used outdoors, such as in an on-vehicle use. Japanese Unexamined Patent Application Publication No. 2017-170303 discloses a liquid droplet removing device in which a piezoelectric element is attached to a drip-proof cover disposed in front of an imaging element. By vibrating the drip-proof cover, droplets in a field of view of an imaging element are removed. The drip-proof cover is held by a support frame. The imaging element is disposed in an internal space formed by the drip-proof cover and the support frame.

In the liquid droplet removing device described in Japanese Unexamined Patent Application Publication No. 2017-170303, the piezoelectric element is directly attached to the drip-proof cover. Thus, in the drip-proof cover, even a portion of the imaging element outside the field of view is vibrated, and there is a possibility that a vibration efficiency is greatly deteriorated. Further, the portion of the drip-proof cover outside the field of view is held by the support frame. Thus, when temperature changes or when external force is applied, there is a possibility that a stress is applied to the drip-proof cover or the piezoelectric element in a vibrator, and vibration is inhibited. Thus, it becomes difficult to obtain desired performance.

SUMMARY OF THE INVENTION

Preferred embodiments of the present invention provide vibration devices and optical detection devices that are each capable of reducing or preventing an influence of a stress applied to a vibrator, and that are each capable of effectively vibrating a cover to which water droplets or the like are attached.

A vibration device according to a preferred embodiment of the present invention includes a vibrator including a cylinder with an opening, a light-transmissive cover directly or indirectly coupled to the cylinder so as to cover the opening of the cylinder, a piezoelectric element to vibrate the light-transmissive cover, and including an opening end portion, an elastic member holding the opening end portion of the vibrator, and a case connected to the elastic member.

A vibration device according to a preferred embodiment of the present invention includes a vibrator including a cylinder with an opening, a light-transmissive cover directly or indirectly coupled to the cylinder so as to cover the opening of the cylinder, a piezoelectric element to vibrate the light-transmissive cover, and including an opening end portion, and a case provided with a projecting portion holding the opening end portion of the vibrator.

An optical detection device according to a preferred embodiment of the present invention includes a vibration device according to a preferred embodiment of the present invention, and an optical detection element disposed so that a detection region is included in the light-transmissive cover.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the present invention will be disclosed, with reference to the accompanying drawings, and by describing preferred embodiments of the present invention.

Note that, the preferred embodiments described in the present specification are illustrative, and that partial substitutions or combinations of configurations are possible between different preferred embodiments.

Figure 1:
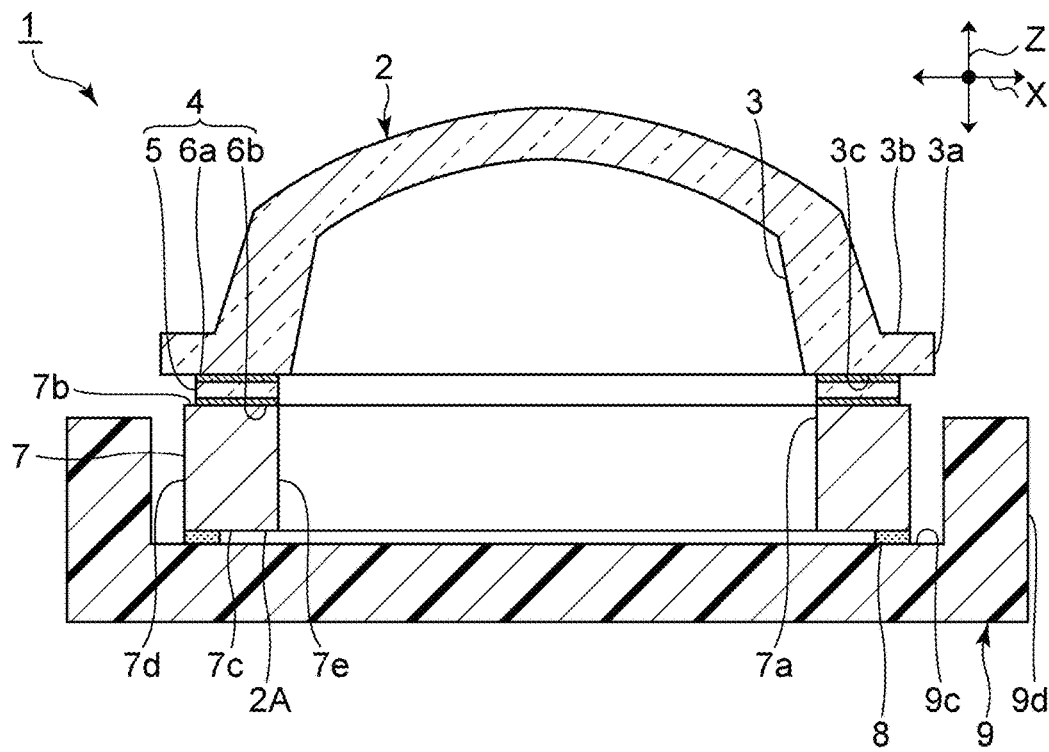
FIG. 1 is a schematic elevation sectional view of a vibration device according to a first preferred embodiment of the present invention.
Figure 2:
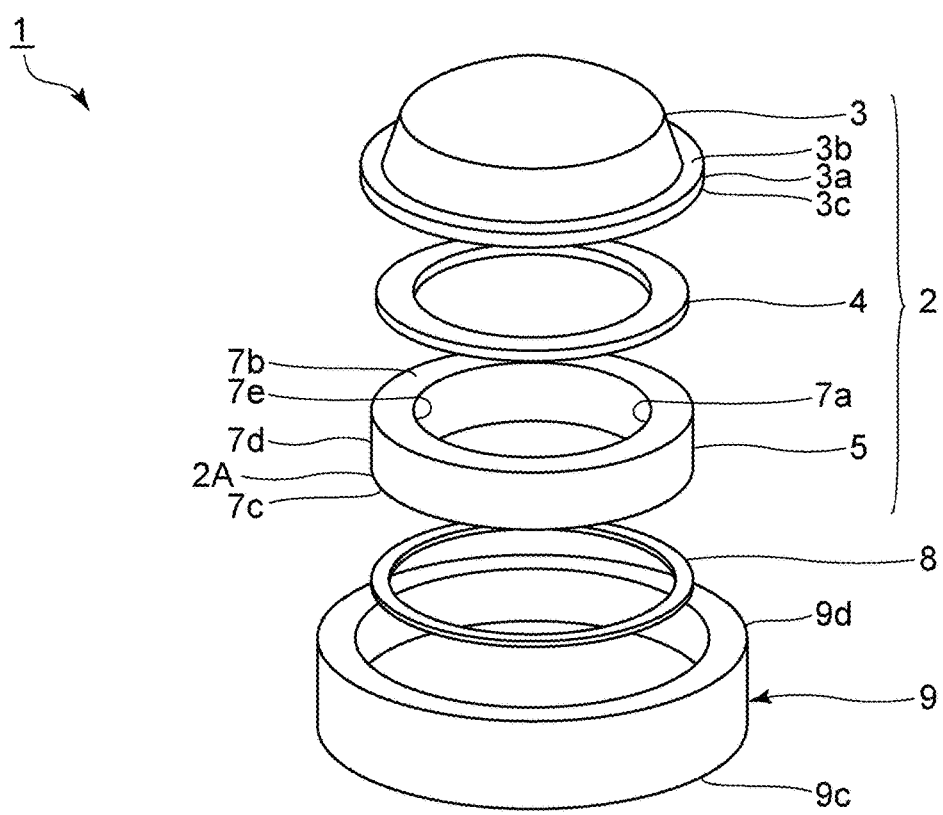
FIG. 2 is an exploded perspective view of the vibration device according to the first preferred embodiment of the present invention.

FIG. 1 is a schematic elevation sectional view of a vibration device according to a first preferred embodiment of the present invention. FIG. 2 is an exploded perspective view of the vibration device according to the first preferred embodiment.

A vibration device 1 illustrated in FIG. 1 and FIG. 2 removes water droplets or foreign matter from within a field of view of an imaging element, by moving the water droplets or foreign matter with vibration, or atomizing the water droplets or the like. The vibration device 1 includes a vibrator 2 and a case member 9. The vibrator 2 includes a light-transmissive cover 3, a piezoelectric element 4, and a cylinder 7. Here, when a direction in which the cylinder 7 extends is defined as an axial direction Z, the vibrator 2 of the vibration device 1 includes an opening end portion 2A positioned closer to the cylinder 7 than the light-transmissive cover 3 in the axial direction Z. The vibration device includes as an elastic member 8 provided between the opening end portion 2A of the vibrator 2 and the case member 9 of the vibrator 2.

The light-transmissive cover 3, the piezoelectric element 4, the cylinder 7, the elastic member 8, and the case member 9 define an internal space. An optical detection element, such as an imaging element, is disposed in the internal space. Note that, in the present specification, the internal space is not limited to a hermetically sealed space, and a space partially open to the exterior is also defined as an internal space.

Hereinafter, a configuration of the vibration device 1 will be described in detail.

The light-transmissive cover 3 has a dome shape. The light-transmissive cover 3 has a circular or substantially circular shape in a plan view. The light-transmissive cover 3 includes a bottom surface 3c. The bottom surface 3c is positioned on a side of the cylinder 7 in the vibrator 2. The light-transmissive cover 3 includes a flange portion 3a provided in a vicinity of the bottom surface 3c. The flange portion 3a includes a first surface 3b and a second surface that is on the opposite side of the first surface 3b. In the present preferred embodiment, the second surface of the flange portion 3a is included in the bottom surface 3c. Note that, the shape of the light-transmissive cover 3 is not limited to the above, and may have flat plate shape, for example. A shape in a plan view of the light-transmissive cover 3, may be, for example, a polygon. The light-transmissive cover 3 need not include the flange portion 3a. In the present specification, "in a plan view" refers to viewing from an upside in the axial direction Z. The upside in the axial direction Z corresponds to an upside in FIG. 1.

As a material of the light-transmissive cover 3, for example, a light-transmissive plastic, a glass such as quartz or boron acid, a light-transmissive ceramic, or the like may preferably be used. Light-transmissive in the present specification refers to transmittance with which at least an energy line or light having a wave length to be detected by an optical detection element such as the above imaging element is transmitted.

As illustrated in FIG. 1, the piezoelectric element 4 is attached to the bottom surface 3c of the light-transmissive cover 3. The piezoelectric element 4 includes an annular or substantially annular piezoelectric body 5. As a material of the piezoelectric body 5, for example, a suitable piezoelectric ceramics such as PZT or (K, Na)NbO$_3$ or a suitable piezoelectric single crystal such as LiTaO$_3$ or LiNbO$_3$ may preferably be used. The shape of the piezoelectric body 5 is not limited to the above.

The piezoelectric element 4 includes a first electrode 6a provided on one main surface of the piezoelectric body 5, and a second electrode 6b provided on the other main surface. The first electrode 6a and the second electrode 6b are each annular or substantially annular, and are provided on opposite sides of the piezoelectric body 5. The first electrode 6a and the second electrode 6b are each made of suitable metal. The first electrode 6a and the second electrode 6b may be, for example, Ni electrodes, or may be electrodes each made of a metal thin film such as Ag or Au formed by a sputtering method or the like.

Note that, in the present preferred embodiment, one piezoelectric element 4 that is annular or substantially annular is provided, but the present preferred embodiment is not limited thereto. For example, a plurality of rectangular or substantially rectangular plate-shaped piezoelectric elements may be provided along an outer peripheral edge of the light-transmissive cover 3.

The first electrode 6a of the piezoelectric element 4 is attached to the light-transmissive cover 3. The cylinder 7 is attached to the second electrode 6b of the piezoelectric element 4. The cylinder 7 has an opening 7a. In the present preferred embodiment, the light-transmissive cover 3 is indirectly coupled to the cylinder 7 with the piezoelectric element 4 interposed therebetween, so as to cover the opening 7a of the cylinder 7. Note that, the cylinder 7 is preferably cylindrical or substantially cylindrical. However, the shape of the cylinder 7 is not limited to the cylindrical or substantially cylindrical shape, and may be, for example, a rectangular or substantially rectangular cylindrical shape or the like.

The cylinder 7 includes a first opening end surface 7b and a second opening end surface 7c that is on the opposite side of the first opening end surface 7b. The first opening end surface 7b, of the first opening end surface 7b and the second opening end surface 7c is positioned closer to the light-transmissive cover 3. The piezoelectric element 4 is attached to the first opening end surface 7b.

A direction connecting the first opening end surface 7b and the second opening end surface 7c that is a direction in which the cylinder 7 extends is the axial direction Z. A direction orthogonal or substantially orthogonal to the axial direction Z is defined as a radial direction X. Note that, in the present specification, the radial direction X may be described as a direction X orthogonal or substantially orthogonal to the axial direction Z. The cylinder 7 includes an outer surface 7d positioned outside in the radial direction X, and an inner surface 7e positioned inside in the radial direction X.

Here, the vibrator 2 includes an opening end surface not sealed by the light-transmissive cover 3, and an outer surface and an inner surface that are connected to the opening end surface. In the present preferred embodiment, the opening end surface of the vibrator 2 is the second opening end surface 7c of the cylinder 7. The outer surface 7d of the cylinder 7 defines a portion of the outer surface of the vibrator 2. The inner surface 7e of the cylinder 7 defines a portion of the inner surface of the vibrator 2. In the vibration device 1, the opening end portion 2A of the vibrator 2 includes the second opening end surface 7c of the cylinder 7, and includes respective portions near the second opening end surface 7c, of the outer surface 7d and the inner surface 7e.

The cylinder 7 is made of suitable metal. Note that, the material of the cylinder 7 is not limited to the above, and may be an appropriate ceramic or the like, for example. As in the present preferred embodiment, when the cylinder 7 is made of metal, the cylinder 7 may be used as a second electrode of the piezoelectric element 4. In this case, the second electrode 6b of the piezoelectric element 4 illustrated in FIG. 1 need not be separately provided.

As illustrated in FIG. 1 and FIG. 2, the vibration device 1 includes the case member 9. The case member 9 includes a bottom plate portion 9c, and a side wall portion 9d provided on the bottom plate portion 9c. The case member 9 has a cylindrical or substantially circular shape in a plan view. Note that, the shape of the case member 9 is not limited to the above, and, in a plan view, for example, may have a shape such as a rectangular or substantially rectangular shape. In the present preferred embodiment, the case member 9 is preferably made of suitable resin, for example.

The elastic member 8 is provided on the bottom plate portion 9c of the case member 9. The elastic member 8 of the vibration device 1 is preferably an elastic sheet having an annular or substantially annular shape, and a sheet shape. However, the shape of the elastic sheet is not limited to the annular or substantially annular shape. The elastic sheet is preferably made of, for example, rubber or the like.

The elastic member 8 is provided between the opening end portion 2A of the vibrator 2 and the bottom plate portion 9c of the case member 9. More specifically, the elastic member 8 is provided between the second opening end surface 7c of the cylinder 7 and the bottom plate portion 9c of the case member 9. In this way, the elastic member 8 holds the vibrator 2. In a plan view, an entirety or substantially an entirety of the elastic member 8 overlaps with the cylinder 7. However, the disposition of the elastic member 8 is not limited to the above. The elastic member 8 is not limited to the elastic sheet. An elastic modulus of the elastic member 8 is preferably larger than an elastic modulus of the cylinder 7.

A feature of the present preferred embodiment is that the vibrator 2 is held by the elastic member 8. Thus, an influence of a stress applied to the vibrator 2 can be reduced or prevented, and the light-transmissive cover 3 to which water droplets or the like are attached can be efficiently vibrated. This will be described below by comparing the present preferred embodiment with a first comparative example.

A vibration device of the first comparative example that is different from the first preferred embodiment in that an elastic member is not included, and the vibration device having the configuration of the first preferred embodiment were prepared. Note that, a case member including an opening at a center portion thereof was used as a case member of the vibration device in the present comparative example.

Figure 3:
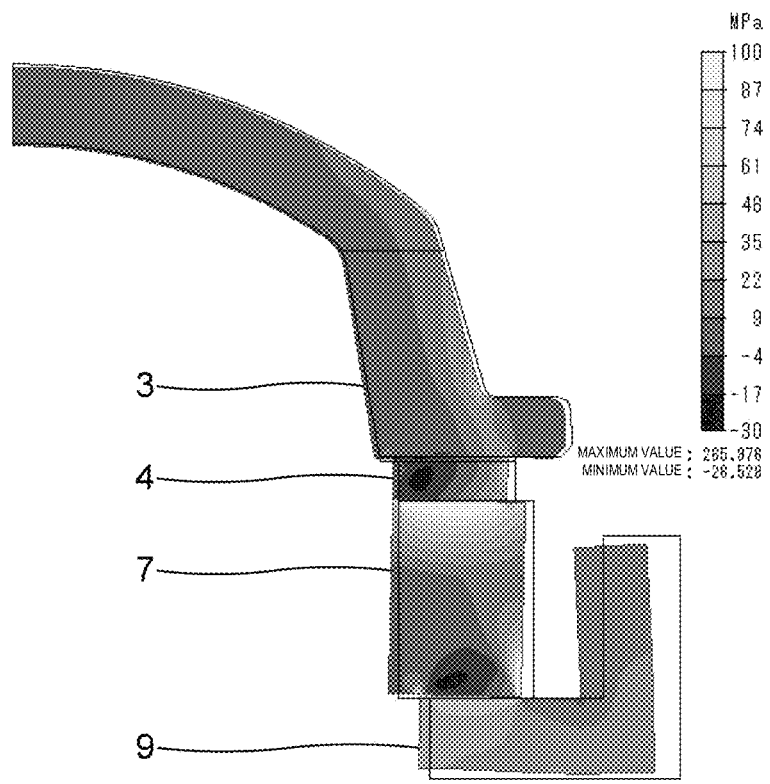
FIG. 3 is a diagram illustrating thermal stress distribution at about −55° C. with reference to about 140° C. standards in a first comparative example.
Figure 4:
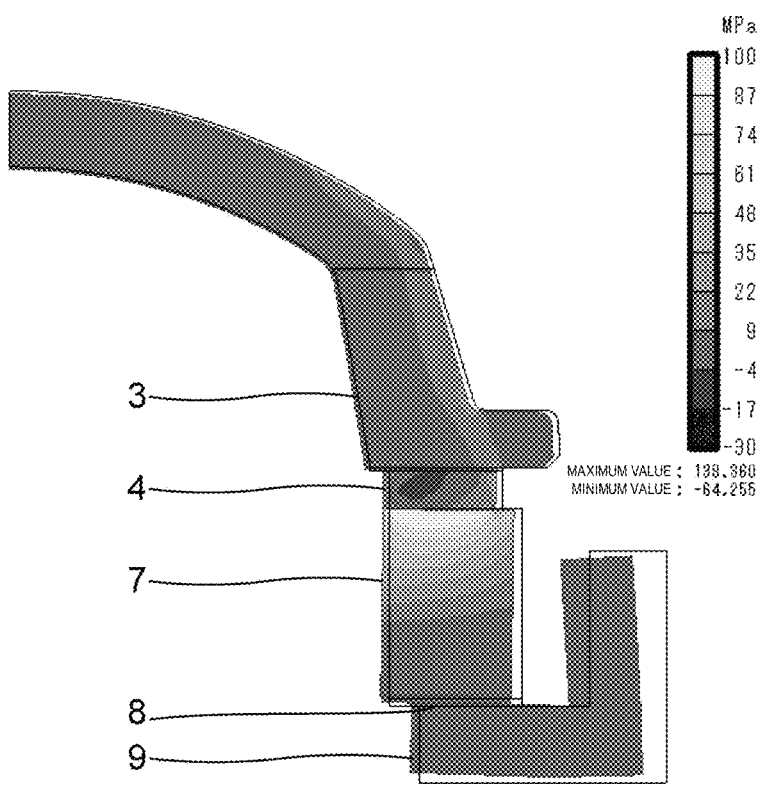
FIG. 4 is a diagram illustrating thermal stress distribution at about −55° C. with reference to about 140° C. standards in the first preferred embodiment of the present invention.

FIG. 3 is a diagram illustrating thermal stress distribution at about −55° C. with reference to about 140° C. standards in a first comparative example. FIG. 4 is a diagram illustrating thermal stress distribution at about −55° C. with reference to about 140° C. standards in the first preferred embodiment. Note that, FIG. 3 and FIG. 4 each illustrates a portion corresponding to half a section illustrated in FIG. 1. Stress distribution diagrams other than FIG. 3 and FIG. 4 may also illustrate a portion corresponding to half a section along an axial direction of the vibration device. In FIG. 3 and FIG. 4, a positive value indicates a tensile stress, and a negative value indicates a compressive stress.

As illustrated in FIG. 3, it can be understood that, in the first comparative example, since the case member 9 contracts when being cooled, a large compressive stress is applied to the cylinder 7 of the vibrator 2 from the case member 9. As described above, when a large stress is applied to the vibrator 2, vibration of the vibrator 2 is inhibited. Thus, vibration efficiency of the light-transmissive cover 3 to which water droplets or the like are attached is also reduced.

Compared to this, FIG. 4 illustrates that, in the first preferred embodiment, although the case member 9 contracts, a stress applied to the vibrator 2 from the case member 9 is reduced by the elastic member 8. Thus, an influence of a stress applied to the vibrator 2 can be reduced or prevented, and the light-transmissive cover 3 to which water droplets or the like are attached can be efficiently vibrated.

In addition, since the elastic member 8 is provided, outward leakage of vibration from the vibrator 2 can also be reduced or prevented. In this way, the leakage of vibration can also be reduced or prevented, by a configuration other than strictly optimizing a dimension of each portion of the vibrator 2. Thus, a management range of the dimension of the each portion of the vibrator 2 can be increased, and a degree of freedom in design can be improved.

Figure 5:
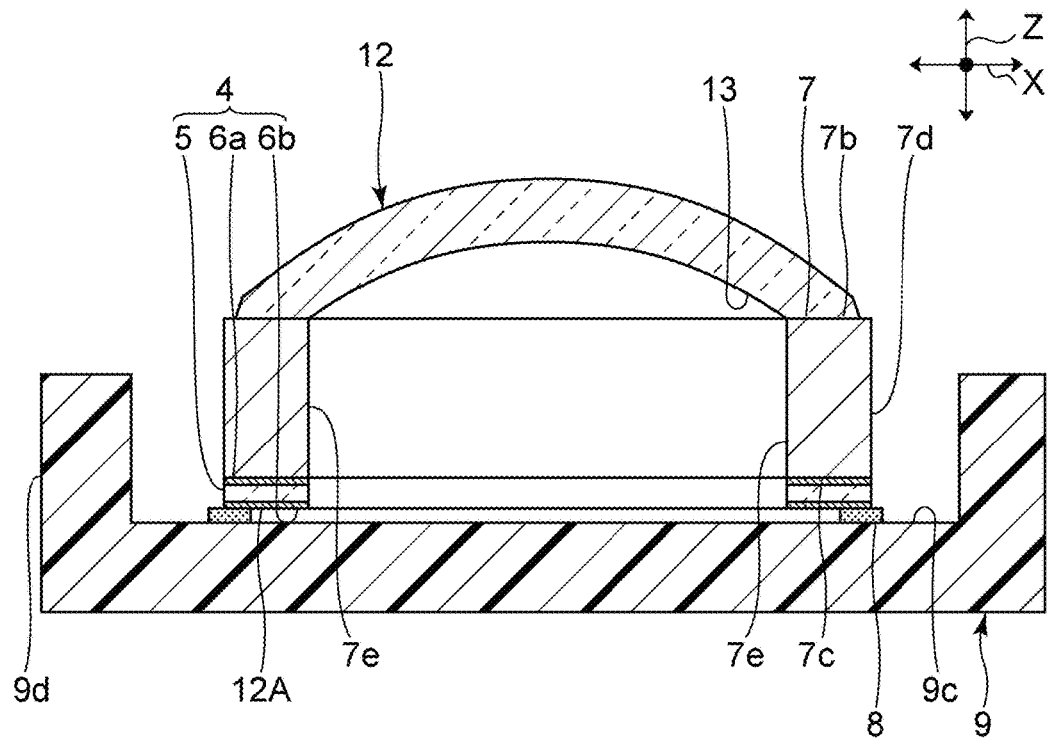
FIG. 5 is a schematic elevation sectional view of a vibration device according to a modified example of the first preferred embodiment of the present invention.

FIG. 5 is a schematic elevation sectional view of a vibration device according to a modified example of the first preferred embodiment.

A light-transmissive cover 13 of the present modified example does not include a flange portion. The light-transmissive cover 13 is directly coupled to the first opening end surface 7b of the cylinder 7. The piezoelectric element 4 is provided on the second opening end surface 7c of the cylinder 7. The piezoelectric element 4 is positioned at an opening end portion 12A of a vibrator 12. The elastic member 8 is provided between the piezoelectric element 4 and the bottom plate portion 9c of the case member 9. In a plan view, the elastic member 8 includes a portion positioned outside the vibrator 12. In the case of the present modified example, as in the first preferred embodiment, it is possible to reduce or prevent an influence of a stress applied to the vibrator 12, and to effectively vibrate the light-transmissive cover 13 to which water droplets or the like are attached.

Figure 6:
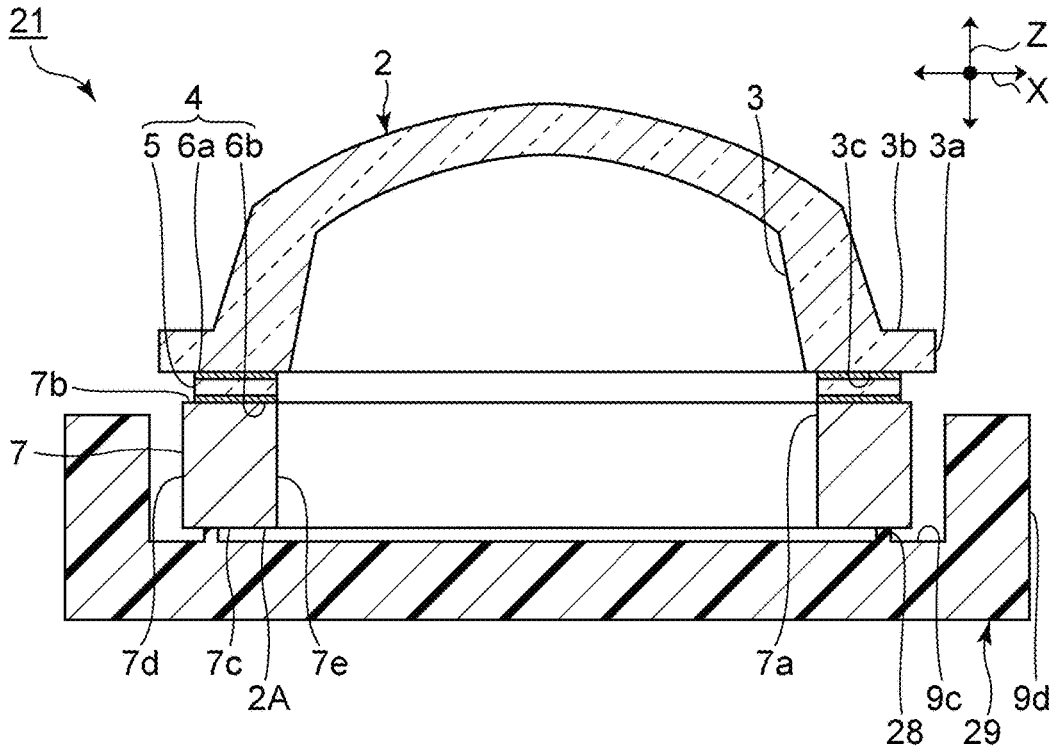
FIG. 6 is a schematic elevation sectional view of a vibration device according to a second preferred embodiment of the present invention.
Figure 7:
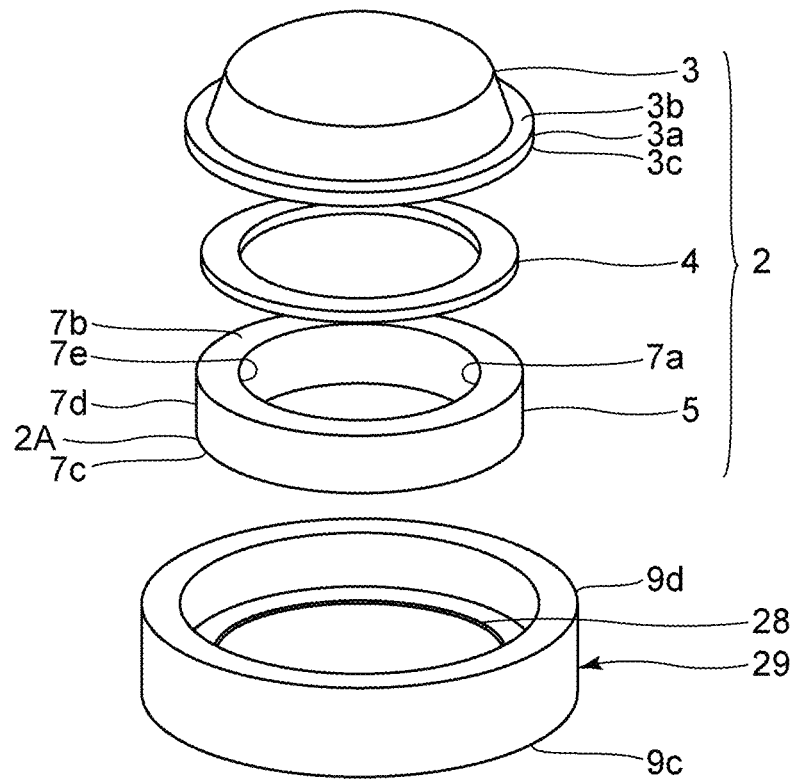
FIG. 7 is an exploded perspective view of the vibration device according to the second preferred embodiment of the present invention.

FIG. 6 is a schematic elevation sectional view of a vibration device according to a second preferred embodiment of the present invention. FIG. 7 is an exploded perspective view of the vibration device according to the second preferred embodiment.

As illustrated in FIG. 6 and FIG. 7, a vibration device 21 of the present preferred embodiment is different from the first preferred embodiment in that an elastic member is not included, a projection portion 28 is provided on a case member 29, and the projecting portion 28 holds the vibrator 2. In other respects described above, the vibration device 21 according to the present preferred embodiment has the same or similar configuration to that of the vibration device 1 according to the first preferred embodiment.

The projecting portion 28 is provided on the bottom plate portion 9c of the case member 29. In the present preferred embodiment, one projecting portion 28 that is annular or substantially annular is provided. Note that, a plurality of projecting portions may be provided along a circumferential direction. In the present specification, the circumferential direction is a circumferential direction about an axis extending in the axial direction Z. In addition, when a thickness along the direction X orthogonal or substantially orthogonal to the axial direction Z is defined as a radial thickness, it is preferable that a radial thickness of the projecting portion 28 is equal to or less than half a radial thickness of the opening end portion 2A of the vibrator 2. Thus, the vibrator 2 can be vibrated more efficiently.

As illustrated in FIG. 6, a section along the axial direction Z of the projecting portion 28 has a rectangular or substantially rectangular shape. Note that, the projecting portion 28 may have, for example, a sectional shape such as a trapezoidal shape, a triangular shape, or a substantially semicircular shape, in which a side closer to the vibrator 2 is convex.

The projecting portion 28 is provided integrally with the bottom plate portion 9c, and is preferably made of, for example, resin or the like. Note that, the projecting portion 28 may be provided as a different body from the bottom plate portion 9c. In this case, a material different from that of the case member 29 may be used for the projecting portion 28, or for example, the projecting portion 28 may be made of metal or the like.

In the present preferred embodiment, the vibrator 2 is held by the projecting portion 28. Thus, an influence of a stress applied to the vibrator 2 can be reduced or prevented, and the light-transmissive cover 3 to which water droplets or the like are attached can be efficiently vibrated.

Figure 8:
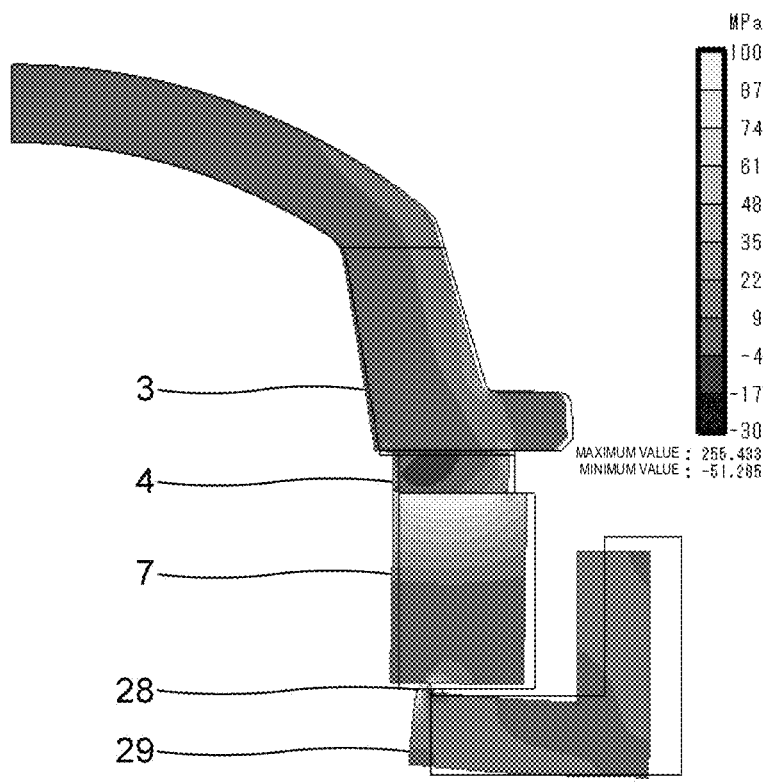
FIG. 8 is a diagram illustrating thermal stress distribution at about −55° C. with reference to about 140° C. standards in the second preferred embodiment of the present invention.

FIG. 8 is a diagram illustrating thermal stress distribution at about −55° C. with reference to about 140° C. standards in the second preferred embodiment. Note that, the case member including the opening at the center portion was used as the case member of the vibration device in which the thermal stress distribution was determined.

FIG. 8 illustrates that, in the second preferred embodiment, although the case member 29 contracts, a stress applied to the vibrator 2 from the case member 29 is reduced by the projecting portion 28. Thus, an influence of a stress applied to the vibrator 2 can be reduced or prevented, and the light-transmissive cover 3 to which water droplets or the like are attached can be efficiently vibrated.

Figure 9:
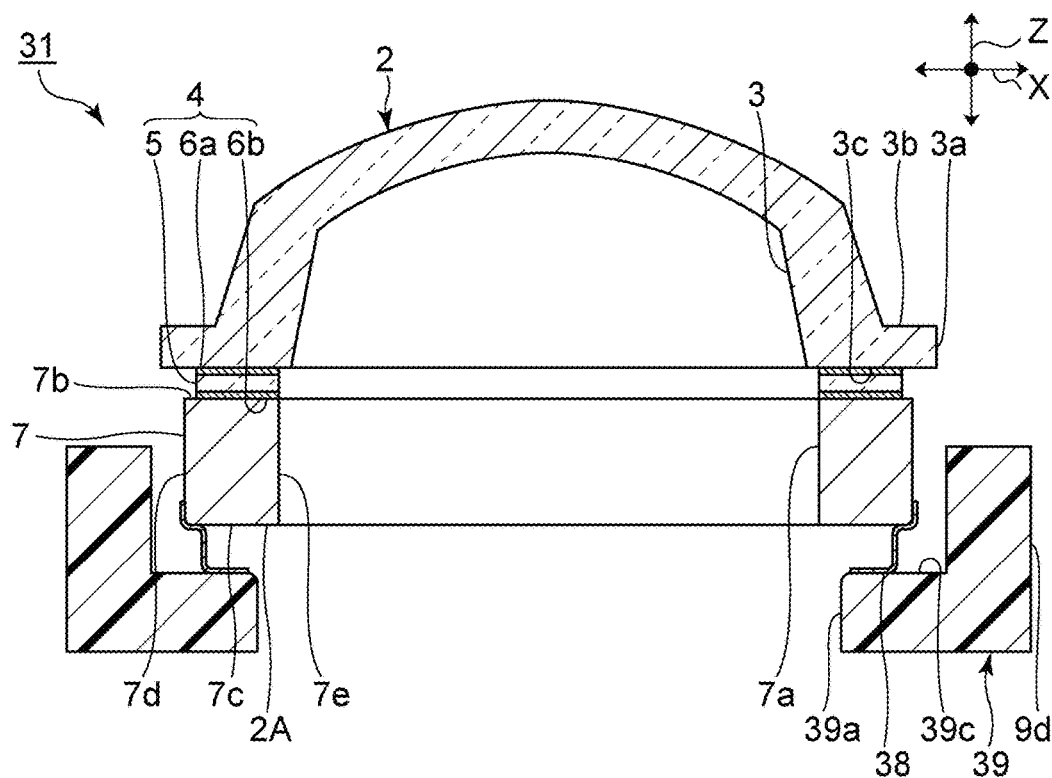
FIG. 9 is a schematic elevation sectional view of a vibration device according to a third preferred embodiment of the present invention.
Figure 10:
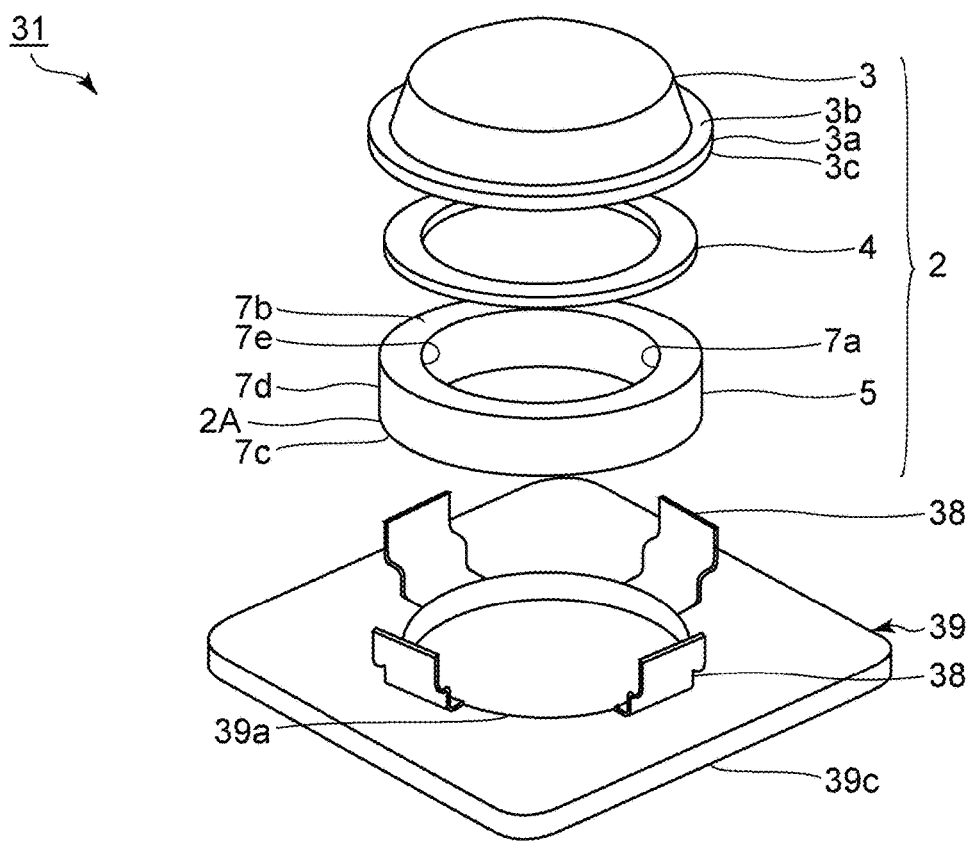
FIG. 10 is an exploded perspective view of the vibration device according to the third preferred embodiment of the present invention, from which a side wall portion of a case member is omitted.
Figure 11:
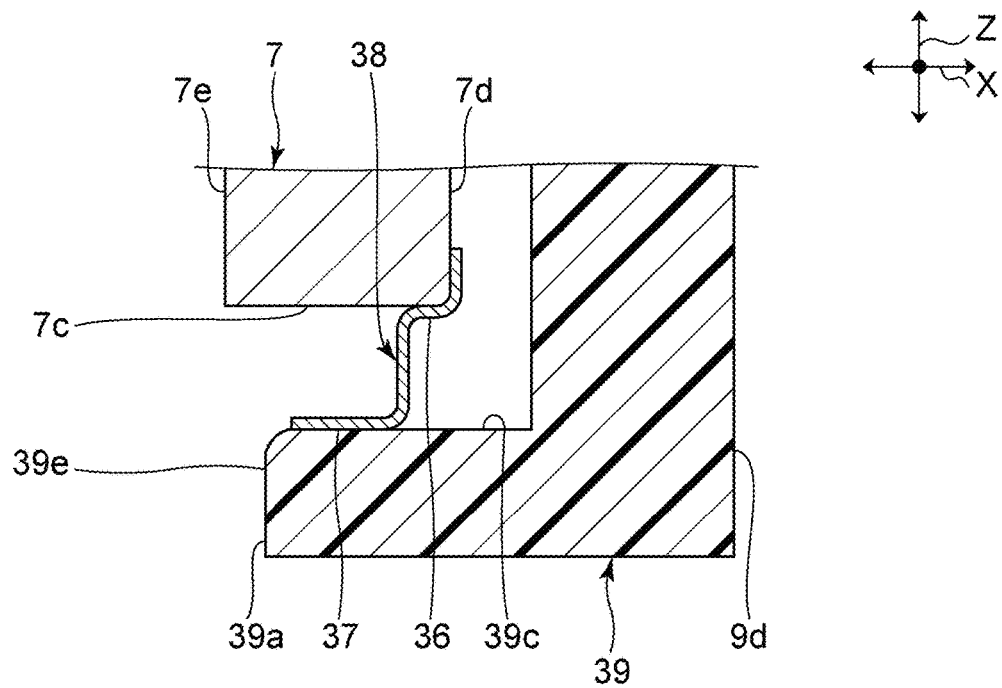
FIG. 11 is an enlarged view of FIG. 9.

FIG. 9 is a schematic elevation sectional view of a vibration device according to a third preferred embodiment of the present invention. FIG. 10 is an exploded perspective view of the vibration device according to the third preferred embodiment, from which the side wall portion of a case member is omitted. FIG. 11 is an enlarged view of FIG. 9.

As illustrated in FIG. 9, the present preferred embodiment is different from the first preferred embodiment in that an elastic member 38 is a leaf spring, and is different in a shape of a case member 39. In other respects described above, the vibration device 31 according to the present preferred embodiment has the same or similar configuration to that of the vibration device 1 according to the first preferred embodiment.

More specifically, as illustrated in FIG. 10, the case member 39 has a rectangular or substantially rectangular shape in a plan view. A bottom plate portion 39c of the case member 39 is provided with an opening 39a. The bottom plate portion 39c includes a side surface 39e that connects both main surfaces of the bottom plate portion 39c to each other in the opening 39a.

In the present preferred embodiment, a plurality of the elastic members 38 provided along a circumferential direction hold the vibrator 2. However, one elastic member made of a leaf spring having an annular or substantially annular shape in a plan view may be provided.

As illustrated in FIG. 11, the elastic member 38 includes a first connection portion 36 connected to the opening end portion 2A of the vibrator 2, and a second connection portion 37 connected to the case member 39. In the present preferred embodiment, a section along the axial direction Z of the first connection portion 36 has an L or substantially L shape. The first connection portion 36 is connected to the second opening end surface 7c and the outer surface 7d of the cylinder 7 in the vibrator 2. By fitting the first connection portion 36 of the elastic member 38 to the cylinder 7, the first connection portion 36 and the cylindrical member 7 are connected to each other. Note that, the method of connecting the first connection portion 36 and the cylinder 7 is not limited to the above, and connection may be performed by, for example, a conductive adhesive, solder, welding, or the like.

The second connection portion 37 extends parallel or substantially parallel to the bottom plate portion 39c of the case member 39. More specifically, the second connection portion 37 extends from an outside to an inside in the direction X orthogonal or substantially orthogonal to the axial direction Z. The second connection portion 37 is connected to the bottom plate portion 39c. A method for connecting the second connection portion 37 to the case member 39 is not particularly limited, but connection may be performed by, for example, an adhesive, screwing, or the like. When the second connection portion 37 is screwed, the second connection portion 37 may have a through-hole to accommodate the screw.

In the present preferred embodiment, as in the first preferred embodiment, it is possible to reduce or prevent an influence of a stress applied to the vibrator 2, and to effectively vibrate the light-transmissive cover 3 to which water droplets or the like are attached. This will be described below by comparing the present preferred embodiment with a second comparative example.

A vibration device of the second comparative example that is different from the third preferred embodiment in that an elastic member is not included, and the vibration device according the third preferred embodiment were prepared. In each of the vibration devices described above, a displacement amount was obtained, respectively, while changing temperature. A rate of change in the displacement amount was calculated with reference to about 20° C. standards as a normal temperature.

Figure 12:
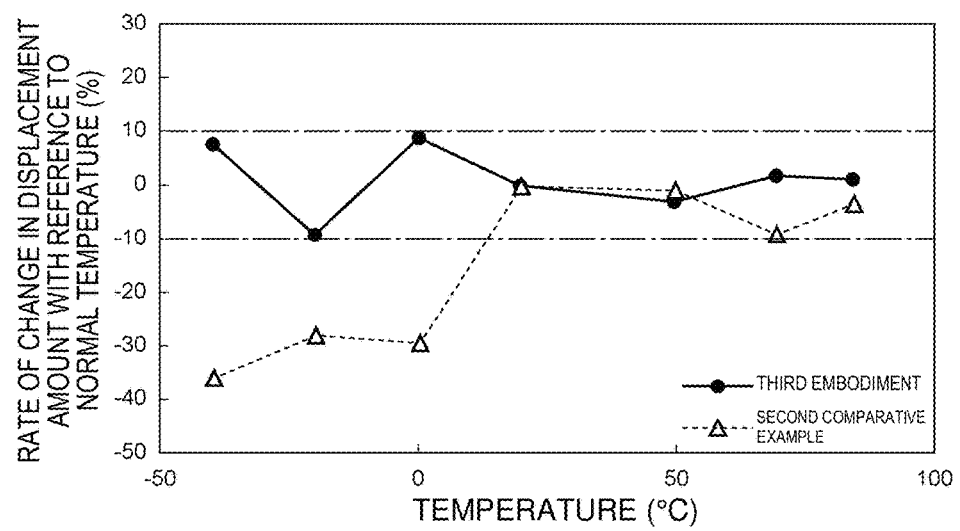
FIG. 12 is a diagram illustrating a rate of change in a displacement amount in each of the vibration device according to the third preferred embodiment of the present invention and a vibration device according to a second comparative example, with reference to a normal temperature.

FIG. 12 is a diagram illustrating a rate of change in a displacement amount in each of the vibration device according to the third preferred embodiment and the vibration device according to the second comparative example, with reference to the normal temperature. In FIG. 12, a solid line indicates a result of the third preferred embodiment, and a broken line indicates a result of the second comparative example.

FIG. 12 illustrates that, in the second comparative example, when a temperature is lower than about 20° C. as the normal temperature, the rate of change in the displacement amount is about −30% to about −40%, and the amount of displacement is small. This is because vibration is inhibited by a stress applied to the vibrator from the case member. Compared to this, in the third preferred embodiment, an absolute value of the rate of change in the displacement amount is less than about 10% irrespective of temperature, and it can be seen that the vibration is stable. As described above, in the third preferred embodiment, it is possible to reduce or prevent the influence of the stress applied to the vibrator 2 due to temperature, and it is possible to efficiently vibrate the light-transmissive cover 3 to which water droplets or the like are attached.

In addition, as in the third preferred embodiment, when the elastic member 38 is the leaf spring, an elastic constant can be easily adjusted, and spring performance can be easily adjusted. Thus, design in consideration of stress when a temperature change occurs or when an external force is applied can be easily achieved, and a degree of freedom in design can be improved.

As in the third preferred embodiment, it is preferable to partially hold the vibrator 2 by the plurality of elastic members 38. Thus, the stress applied to the vibrator 2 can be further reduced, and the vibration is even more unlikely to be inhibited.

In the third preferred embodiment, the four elastic members 38 are preferably provided every about 90° in the circumferential direction, and are disposed so as to be 4-fold rotationally symmetric. As described above, by disposing the plurality of elastic members 38 so as to be rotationally symmetric, bias is unlikely to occur when holding the vibrator 2, and it is possible to suitably hold the vibrator 2. Further, in addition to physical holding stability, stability of a vibration mode of the vibration device 31 is obtained. Note that, the number of elastic members 38 is not limited to the above, and for example, three elastic members 38 may be provided about every 120° in the circumferential direction, and may be disposed so as to be 3-fold rotationally symmetric. However, the plurality of elastic members 38 may not necessarily be disposed so as to be rotationally symmetric.

Hereinafter, first to fourth modified examples of the third preferred embodiment will be described. In the first to fourth modified examples, as in the third preferred embodiment, it is possible to reduce or prevent an influence of a stress applied to the vibrator 2, and to effectively vibrate the light-transmissive cover 3 to which water droplets or the like are attached.

Figure 13:
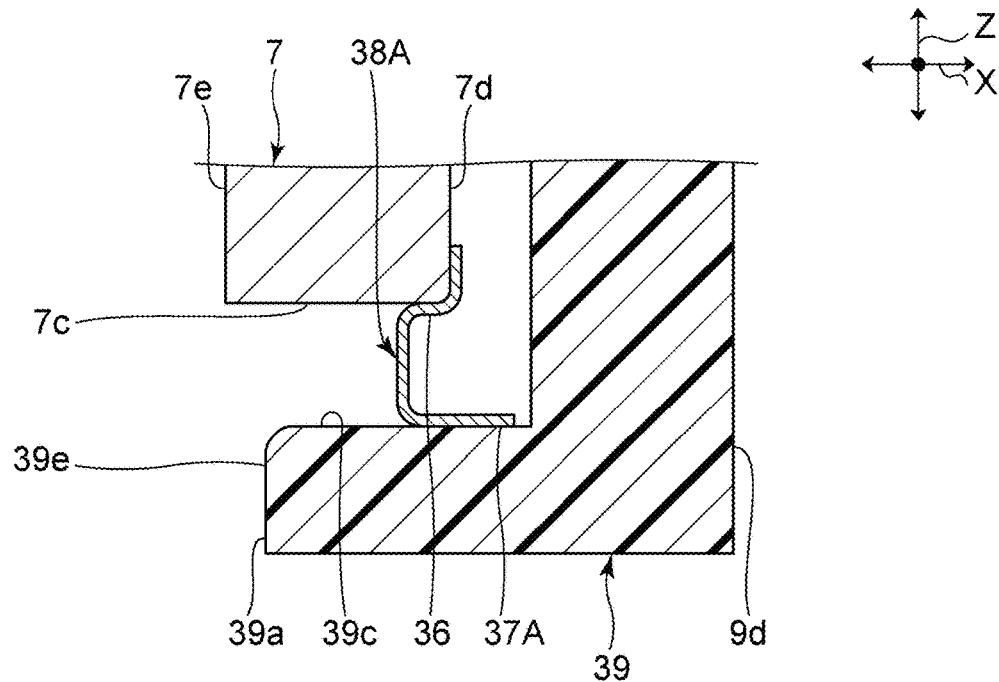
FIG. 13 is a schematic elevation sectional view illustrating a vicinity of an elastic member in a vibration device according to a first modified example of the third preferred embodiment of the present invention.

In the first modified example illustrated in FIG. 13, a second connection portion 37A of an elastic member 38A extends from an inside to an outside in the direction X orthogonal or substantially orthogonal to the axial direction Z.

Figure 14:
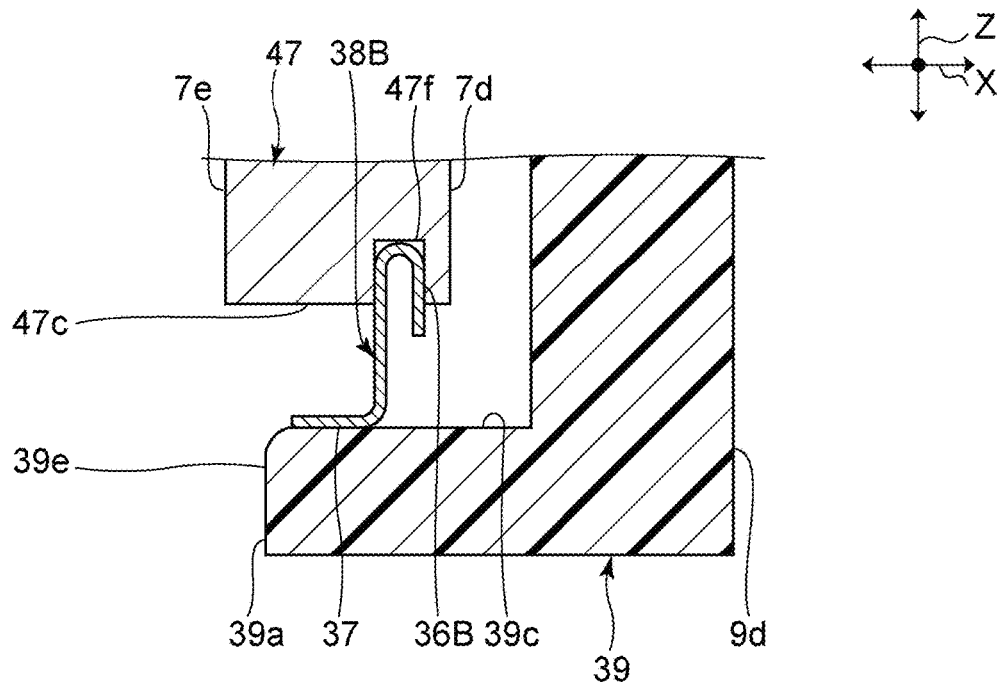
FIG. 14 is a schematic elevation sectional view illustrating a vicinity of an elastic member in a vibration device according to a second modified example of the third preferred embodiment of the present invention.

In the second modified example illustrated in FIG. 14, a first groove portion 47f is provided in a second opening end surface 47c of a cylinder 47 of a vibrator. The first groove portion 47f has an annular or substantially annular shape. On the other hand, a section along the axial direction Z of a first connection portion 36B of an elastic member 38B has a U shape or a substantially U shape. The first groove portion 47f of the cylinder 47 is fitted with the first connection portion 36B of the elastic member 38B, and the first connection portion 36B is connected to an inside of the first groove portion 47f. Note that, a plurality of the first groove portions may be provided along a circumferential direction, in the second opening end surface 47c of the cylinder. The first connection portion 36B of each the elastic member 38B may be connected to an inside of each the first groove.

Figure 15:
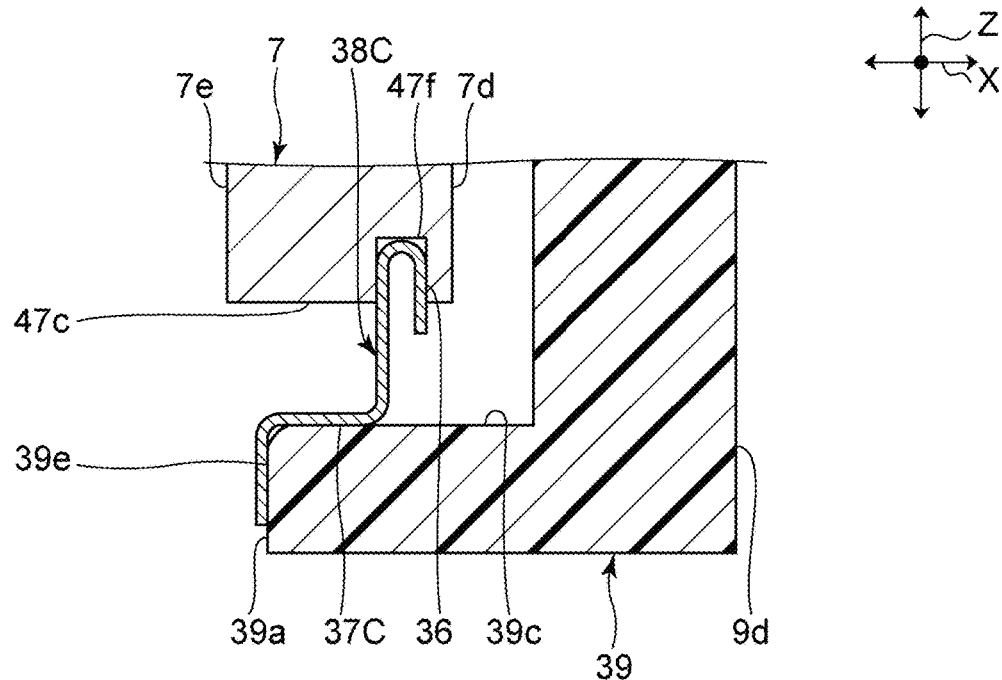
FIG. 15 is a schematic elevation sectional view illustrating a vicinity of an elastic member in a vibration device according to a third modified example of the third preferred embodiment of the present invention.

A vibration device of the third modified example illustrated in FIG. 15 is configured similarly to the vibration device of the second modified example, except for a second connection portion 37C of an elastic member 38C. The second connection portion 37C of the elastic member 38C extends to the side surface 39e from a main surface of the bottom plate portion 39c of the case member 39, on a side of a vibrator. The second connection portion 37C is connected to the main surface and the side surface 39e.

Figure 16:
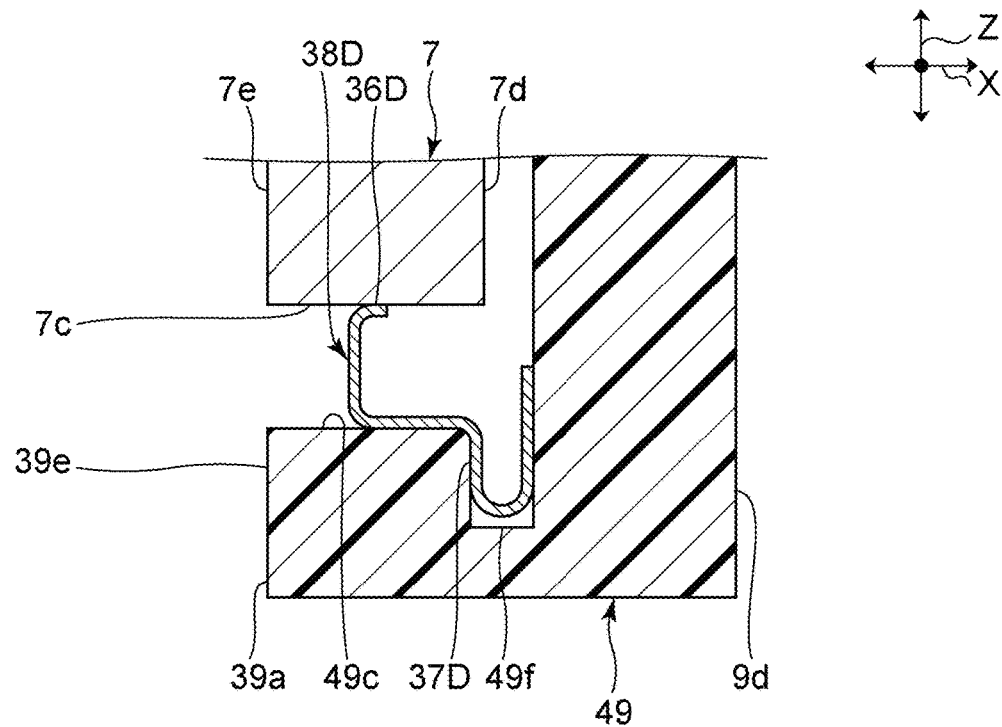
FIG. 16 is a schematic elevation sectional view illustrating a vicinity of an elastic member in a vibration device according to a fourth modified example of the third preferred embodiment of the present invention.

In the fourth modified example illustrated in FIG. 16, a first connection portion 36D of an elastic member 38D is connected to the second opening end surface 7c of the cylinder 7 of a vibrator. A second connection portion 37D of the elastic member 38D includes a portion extending in parallel or substantially in parallel to a main surface of a bottom plate portion 49c of a case member 49, on a side of a vibrator, and from an inside to an outside in the direction X orthogonal or substantially orthogonal to the axial direction Z. The portion extending in the direction X of the second connection portion 37D is connected to the main surface of the bottom plate portion 49c on the side of the vibrator.

The second connection portion 37D includes a portion having a U-shaped or substantially U-shaped section along the axial direction Z. The portion having the U-shaped or substantially U-shaped section is connected to an end portion on an outside in the direction X of the portion extending in the direction X. On the other hand, a second groove portion 49f is provided in a main surface of the bottom plate portion 49c of the case member 49, on the side of the vibrator. The second groove portion 49f has an annular or substantially annular shape. The second groove portion 49f of the case member 49 is fitted with the second connection portion 37D of the elastic member 38D, and the second connection portion 37D is connected to an inside of the second groove portion 49f.

In the present modified example, the second groove portion 49f is in contact with the side wall portion 9d. The case member 49 does not include a step portion between the second groove portion 49f and the side wall portion 9d. The portion of the elastic member 38D having the U-shaped or substantially U-shaped section extends to the side wall portion 9d from the inside of the second groove portion 49f, and is also connected to the side wall portion 9d. Note that, the position of the second groove portion 49f is not limited to the above. Alternatively, a plurality of the second grooves may be provided along a circumferential direction, in the bottom plate portion 49c of the case member 49. The second connection portion 37D of each of the elastic members 38D may be connected to an inside of each of the second grooves.

Figure 17:
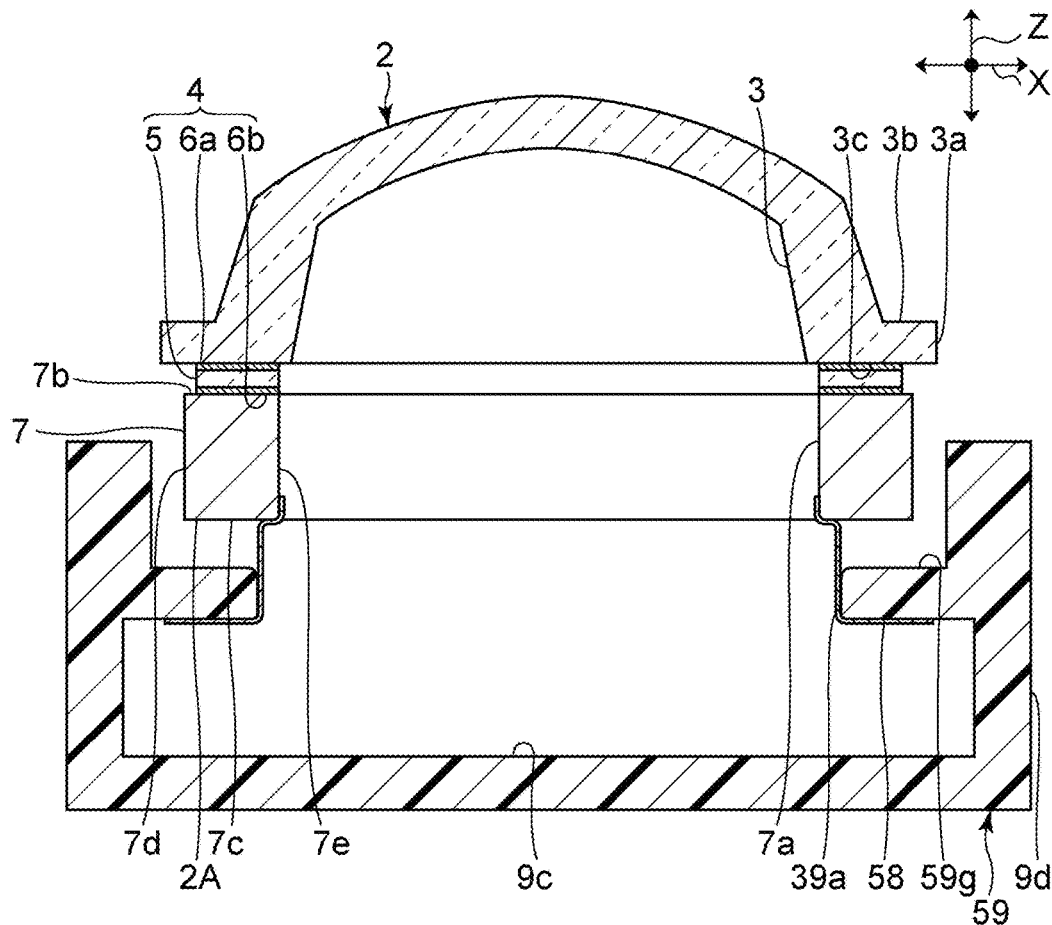
FIG. 17 is a schematic elevation sectional view of a vibration device according to a fourth preferred embodiment of the present invention.
Figure 18:
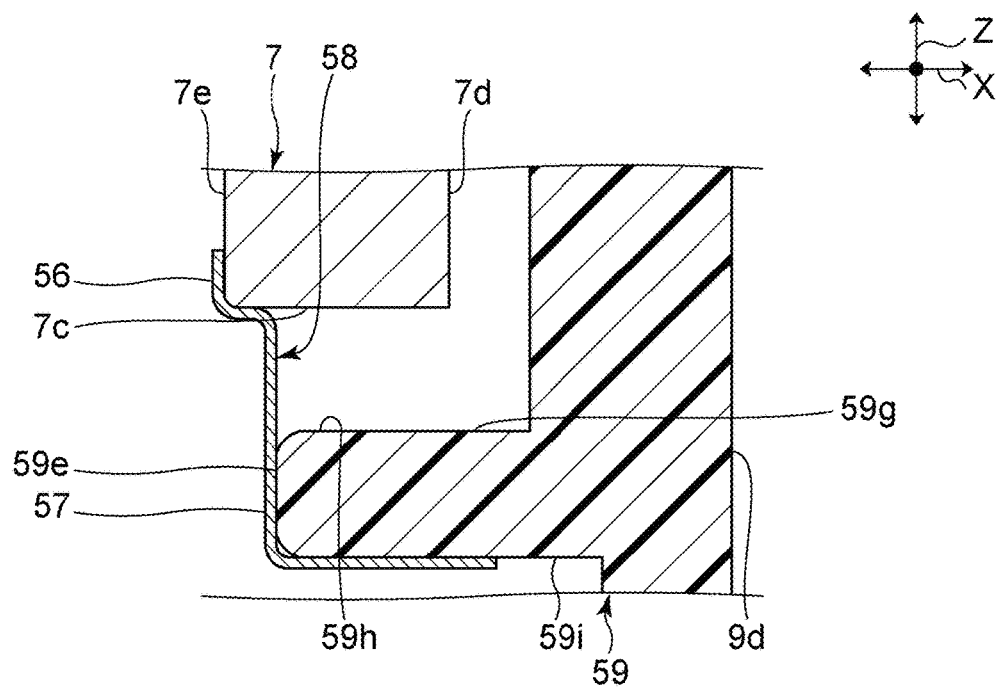
FIG. 18 is an enlarged view of FIG. 17.

FIG. 17 is a schematic elevation sectional view of a vibration device according to a fourth preferred embodiment of the present invention. FIG. 18 is an enlarged view of FIG. 17.

As illustrated in FIG. 17, the present preferred embodiment is different from the third preferred embodiment in a configuration of a case member 59 and a configuration of a leaf spring defining and functioning as an elastic member 58. In other respects described above, the vibration device according to the present preferred embodiment has the same or similar configuration to that of the vibration device 31 according to the third preferred embodiment.

More specifically, as illustrated in FIG. 18, the case member 59 includes a holding portion 59g that extends inward from the side wall portion 9d in the direction X, is connected to the elastic member 58, and holds the vibrator 2 with the elastic member 58 interposed therebetween. The holding portion 59g includes a first surface 59h positioned on a side closer to the vibrator 2, a second surface 59i that is on the opposite side of the first surface 59h, and a side surface 59e connecting the first surface 59h and the second surface 59i to each other. Note that, as illustrated in FIG. 17, in the present preferred embodiment, the bottom plate portion 9c of the case member 59 does not include an opening.

Referring back to FIG. 18, a first connection portion 56 of the elastic member 58 is connected to the inner surface 7e and the second opening end surface 7c of the cylinder 7 of the vibrator 2. A second connection portion 57 is connected to the side surface 59e and the second surface 59i of the holding portion 59g of the case member 59.

In the present preferred embodiment, as in the third preferred embodiment, it is possible to reduce or prevent an influence of a stress applied to the vibrator 2, and to effectively vibrate the light-transmissive cover 3 to which water droplets or the like are attached.

Figure 19:
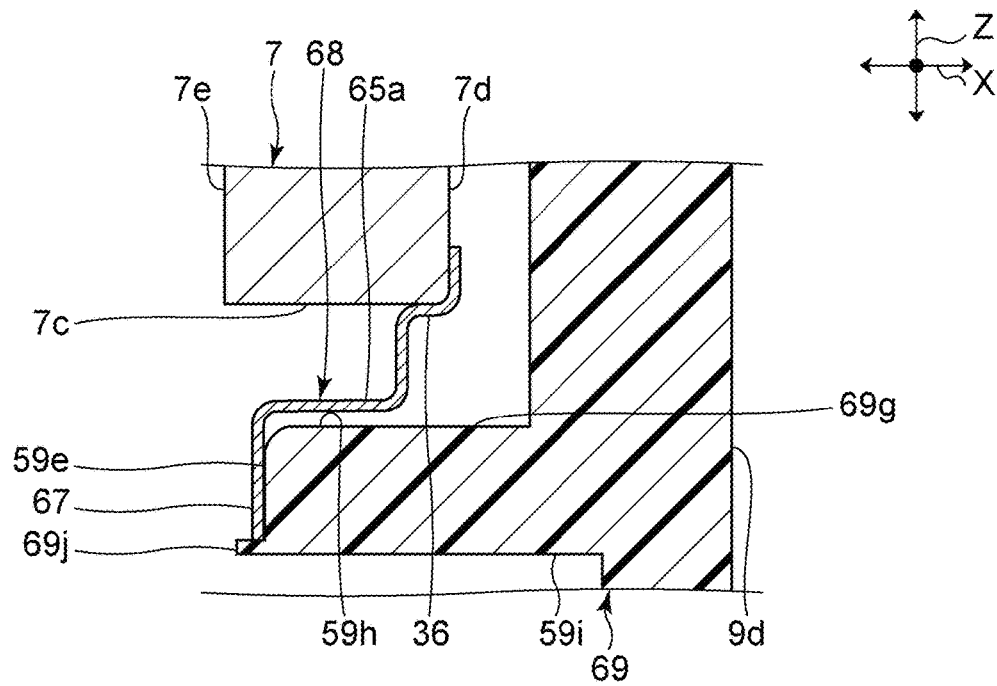
FIG. 19 is a schematic elevation sectional view illustrating a vicinity of an elastic member in a vibration device according to a fifth preferred embodiment of the present invention.

FIG. 19 is a schematic elevation sectional view illustrating a vicinity of an elastic member in a vibration device according to a fifth preferred embodiment of the present invention.

The present preferred embodiment is different from the fourth preferred embodiment in that the side surface 59e of a holding portion 69g of a case member 69 includes a step portion 69j, and is different in a configuration of an elastic member 68. In other respects described above, the vibration device according to the present preferred embodiment has the same or similar configuration to that of the fourth preferred embodiment.

More specifically, the first connection portion 36 of the elastic member 68 is connected to the outer surface 7d and the second opening end surface 7c of the vibrator 2. A second connection portion 67 is connected to the side surface 59e of the holding portion 69g of the case member 69, and an end portion of the second connection portion 67 abuts on the step portion 69j. Thus, the elastic member 68 and the vibrator 2 can be held more reliably by the holding portion 69g.

In addition, since the end portion of the second connection portion 67 abuts the step portion 69j, a first opposing portion 65a does not come into contact with the first surface 59h. Accordingly, an elastic constant of the elastic member 68 can be increased. Thus, it is possible to further reduce or prevent an influence of a stress applied to the vibrator 2 without increasing in size, and it is possible to more efficiently vibrate the light-transmissive cover 3 to which water droplets or the like are attached.

Figure 20:
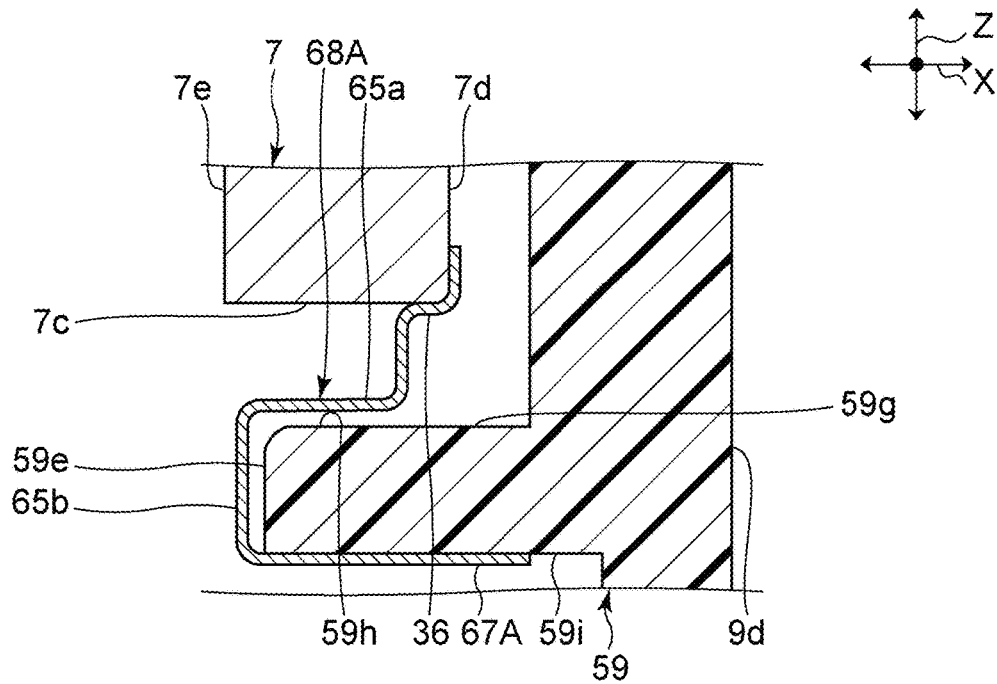
FIG. 20 is a schematic elevation sectional view illustrating a vicinity of an elastic member in a vibration device according to a modified example of the fifth preferred embodiment of the present invention.

FIG. 20 is a schematic elevation sectional view illustrating a vicinity of an elastic member in a vibration device according to a modified example of the fifth preferred embodiment.

The case member 59 according to the present modified example is configured similarly to the fourth preferred embodiment. An elastic member 68A includes the first connection portion 36 and the first opposing portion 65a similar to those of the fifth preferred embodiment. On the other hand, the elastic member 68A includes a second opposing portion 65b, that is a portion opposed to the side surface 59e of the holding portion 59g of the case member 59 with a gap therebetween. A second connection portion 67A of the elastic member 68A is connected to the second surface 59i of the holding portion 59g. Since the first opposing portion 65a and the second opposing portion 65b are provided, it is possible to effectively increase an elastic constant of the elastic member 68A without increasing the size. Thus, it is possible to further effectively suppress influence of a stress applied to the vibrator 2 without increasing the size, and it is possible to more efficiently vibrate the light-transmissive cover 3 to which water droplets or the like are attached.

Figure 21:
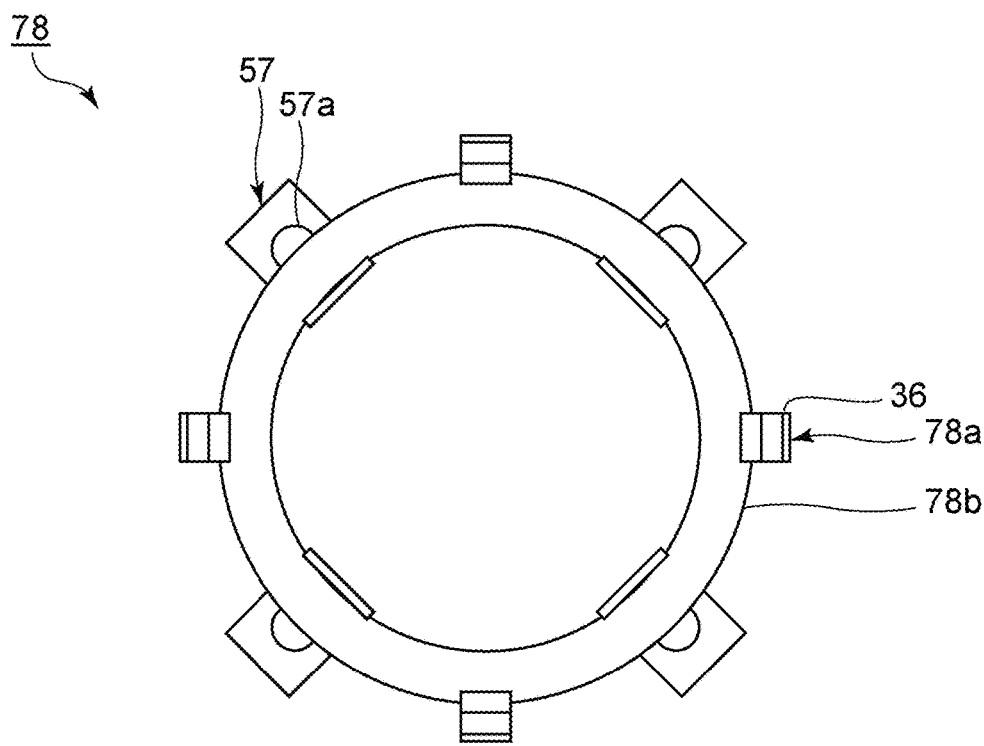
FIG. 21 is a plan view of an elastic member in a vibration device according to a sixth preferred embodiment of the present invention.

FIG. 21 is a plan view of an elastic member in a vibration device according to a sixth preferred embodiment of the present invention.

The present preferred embodiment is different from the third preferred embodiment in a configuration of an elastic member 78. In other respects described above, the vibration device according to the present preferred embodiment has a similar configuration to that of the vibration device 31 according to the third preferred embodiment.

More specifically, the elastic member 78 includes a plurality of spring portions 78a disposed along a circumferential direction, and a frame-shaped portion 78b connecting the spring portions 78a to each other. Each of the spring portions 78a includes the first connection portion 36 connected to the vibrator 2.

The elastic member 78 includes a plurality of second connection portions 57 that are disposed along the circumferential direction, are connected to each other by the frame-shaped portion 78b, and are connected to the case member 39. The second connection portion 57 includes a through-hole 57a. At the through-hole 57a, the second connection portion 57 is connected to and fixed to the case member 39 by a screw, a projection, or the like, for example. However, when the second connection portion 57 is connected to the case member 39 by an adhesive or the like, for example, the second connection portion 57 need not include the through-hole 57a. The frame-shaped portion 78b is annular or substantially annular. Note that, the shape of the frame-shaped portion 78b is not limited to the above.

In the present preferred embodiment, the four spring portions 78a are disposed so as to be 4-fold rotationally symmetric in the circumferential direction. Similarly, the four second connection portions 57 are disposed so as to be 4-fold rotationally symmetric in the circumferential direction. The plurality of second connection portions 57 and the plurality of spring portions 78a are disposed so as not to overlap with each other in a plan view. More specifically, the spring portions 78a and the second connection portions 57 are preferably alternately disposed about every 45°, for example, in the circumferential direction. Accordingly, the elastic member 78 is 4-fold rotationally symmetric as a whole. By disposing the plurality of spring portions 78a and the plurality of second connection portions 57 so as to be rotationally symmetric as described above, bias is unlikely to occur during holding the vibrator 2, and it is possible to suitably hold the vibrator 2.

Note that, the respective numbers of pieces of the plurality of spring portions 78a and the plurality of second connection portions 57 are not limited to the above. For example, three spring portions 78a and the three second connection portions 57 may be disposed so as to be 3-fold rotationally symmetric, respectively. The positional relationship between the plurality of spring portions 78a and the plurality of second connection portions 57 is not limited to the above, and disposition may not necessarily be performed so that an entirety of the elastic member 78 is rotationally symmetric. The plurality of spring portions 78a and the plurality of second connection portions 57 may not necessarily be disposed so as to be rotationally symmetric, respectively.

In the present preferred embodiment, in a plan view, the plurality of spring portions 78a and the plurality of second connection portions 57 do not overlap with each other. Note that, in a plan view, the plurality of spring portions 78a and the plurality of second connection portions 57 may overlap with each other.

Figure 22:
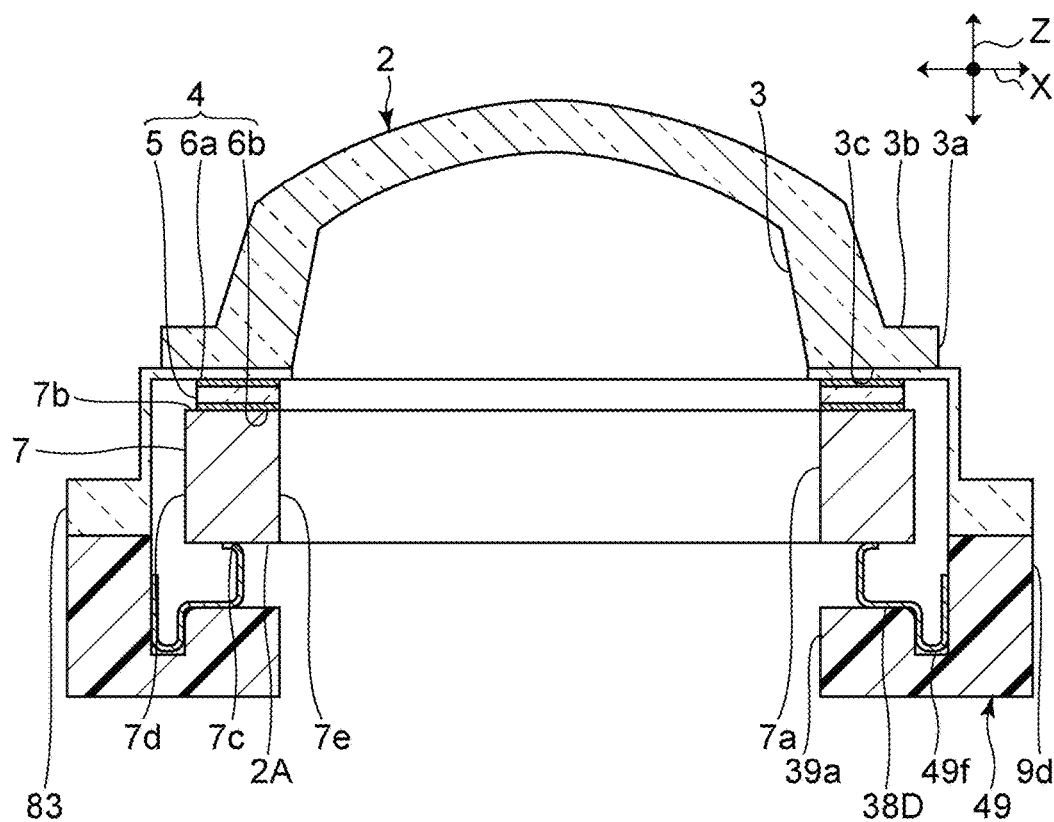
FIG. 22 is a schematic elevation sectional view of a vibration device according to a seventh preferred embodiment of the present invention.
Figure 23:
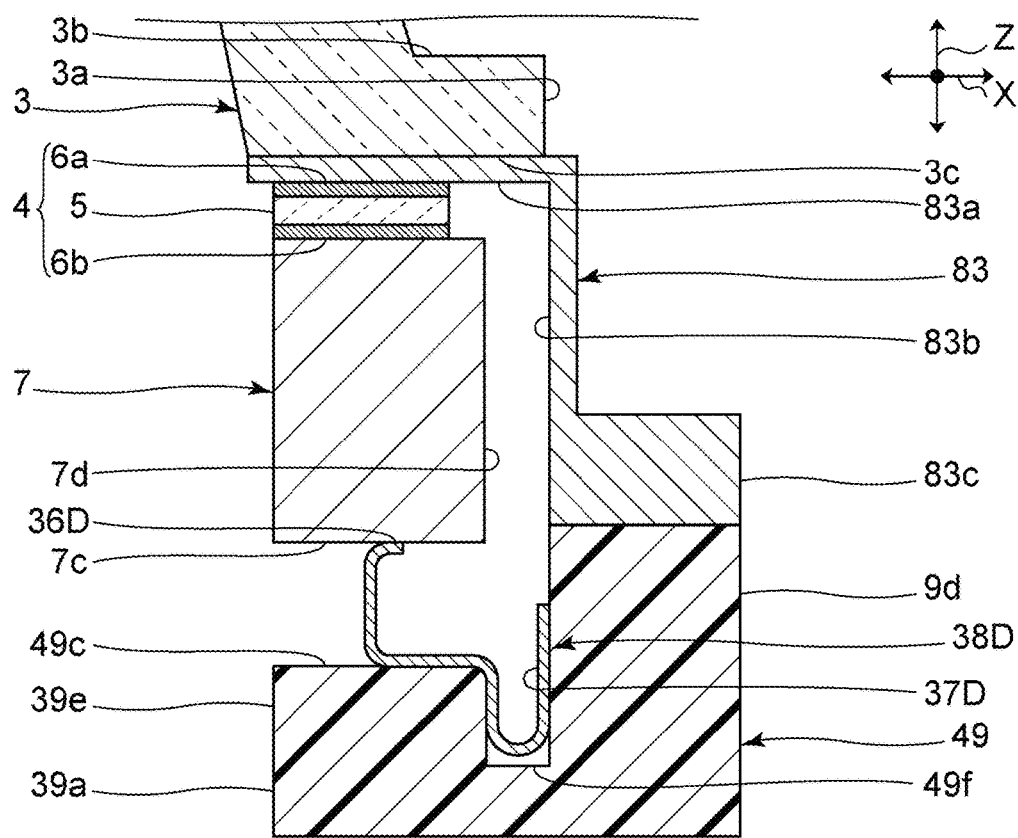
FIG. 23 is an enlarged view of FIG. 22.

FIG. 22 is a schematic elevation sectional view of a vibration device according to a seventh preferred embodiment of the present invention. FIG. 23 is an enlarged view of FIG. 22.

As illustrated in FIG. 22, the present preferred embodiment is different from the third preferred embodiment in that a first support body 83 that extends in the axial direction Z and supports the vibrator 2 is provided. The present preferred embodiment is also different from the third preferred embodiment in that the elastic member 38D and the case member 49 as in the fourth modified example of the third preferred embodiment are included. In other respects described above, the vibration device according to the present preferred embodiment has the same or similar configuration to that of the vibration device 31 according to the third preferred embodiment.

As illustrated in FIG. 23, the first support body 83 includes a third connection portion 83a connected between the piezoelectric element 4 and the light-transmissive cover 3, and a first bottom portion 83c fixed to the case member 49. The first support body 83 includes a first coupling portion 83b extending in the axial direction Z, and coupling the third connection portion 83a and the first bottom portion 83c to each other. The third connection portion 83a is annular or substantially annular. The first coupling portion 83b and the first bottom portion 83c each have a cylindrical or substantially cylindrical shape extending in the axial direction Z. Note that, the shapes of the respective portions of the first support body 83 are not limited to the above. The first coupling portion 83b may have a frame shape other than an annular or substantially annular shape, for example. The first coupling portion 83b and the first bottom portion 83c may each have, for example, a shape such as a rectangular cylindrical shape.

A section along the axial direction Z of the first support body 83 has an L shape or a substantially L shape. More specifically, when a thickness along the direction X orthogonal or substantially orthogonal to the axial direction Z is defined as a radial thickness, a radial thickness of the first bottom portion 83c is larger than a radial thickness of the first coupling portion 83b in the first support body 83. Thus, the first coupling portion 83b is more easily deformed than the first bottom portion 83c, and a spring property is excellent. Note that, the radial thickness of the first bottom portion 83c of the first support body 83 is increased from a side of the first coupling portion 83b toward an outside in the radial direction X.

The first bottom portion 83c of the first support body 83 and the case member 49 are directly connected to each other. The above method of connection is not particularly limited, and the connection may be performed by, for example, an adhesive or screwing.

In the present preferred embodiment, the first support body 83 is preferably made of suitable metal. When the first support body 83 is made of metal, the first support body 83 may be used as a first electrode of the piezoelectric element 4. In this case, the first electrode 6a of the piezoelectric element 4 illustrated in FIG. 22 need not be separately provided. In the present preferred embodiment, routing of electrical connection between the piezoelectric element 4 and the exterior can be easily performed. Thus, productivity can be improved. When the cylinder 7 is also made of metal, the routing of the electric connection between the piezoelectric element 4 and the exterior can be more easily performed, so that the productivity can be further improved.

Note that, the material of the first support body 83 is not limited to the above, and may be an appropriate ceramic or the like, for example. The first support body 83 may be integral, or each portion thereof may be a separate body. In this case, the respective portions of the first support body may be joined by a method such as welding, for example. For example, a configuration may be adopted in which the rigidity of a material of the first bottom portion 83*c* may be higher than the rigidity of a material of the first coupling portion 83*b*.

As described above, the third connection portion 83*a* of the first support body 83 is connected between the piezoelectric element 4 and the light-transmissive cover 3. Note that, the piezoelectric element 4 may be positioned at the opening end portion 2A of the vibrator 2, and the third connection portion 83*a* may be connected between the cylinder 7 and the light-transmissive cover 3.

In the first support body 83, vibration can be absorbed due to a spring property of the first coupling portion 83*b*. Note that, the absorption of vibration by the first coupling portion 83*b* refers to conversion of a vibration propagated from the vibrator 2 through the third connection portion 83*a* into a vibration in the first coupling portion 83*b*. This makes the leakage of the vibration less likely to reach the first bottom portion 83*c*. Thus, leakage and damping of vibration to the case member 49 can be reduced or prevented, and the vibrator 2 can be supported more securely.

The vibrator 2 is, in addition to being held by the elastic member 38D, supported by the first support body 83. Thus, it is possible to further reduce or prevent an influence of a stress applied to the vibrator 2, and it is possible to more efficiently vibrate the light-transmissive cover 3 to which water droplets or the like are attached. Further, durability against vibration shock can be improved, and reliability can be improved.

In the present preferred embodiment, an optical detection element such as an imaging element is disposed in an internal space defined by the vibrator 2, the elastic member 38D, and the case member 49. In addition, the piezoelectric element 4 of the vibrator 2 and the elastic member 38D are covered with the first support body 83, the light-transmissive cover 3 of the vibrator 2, and the case member 49. Thus, waterproof performance can be improved.

Figure 24:
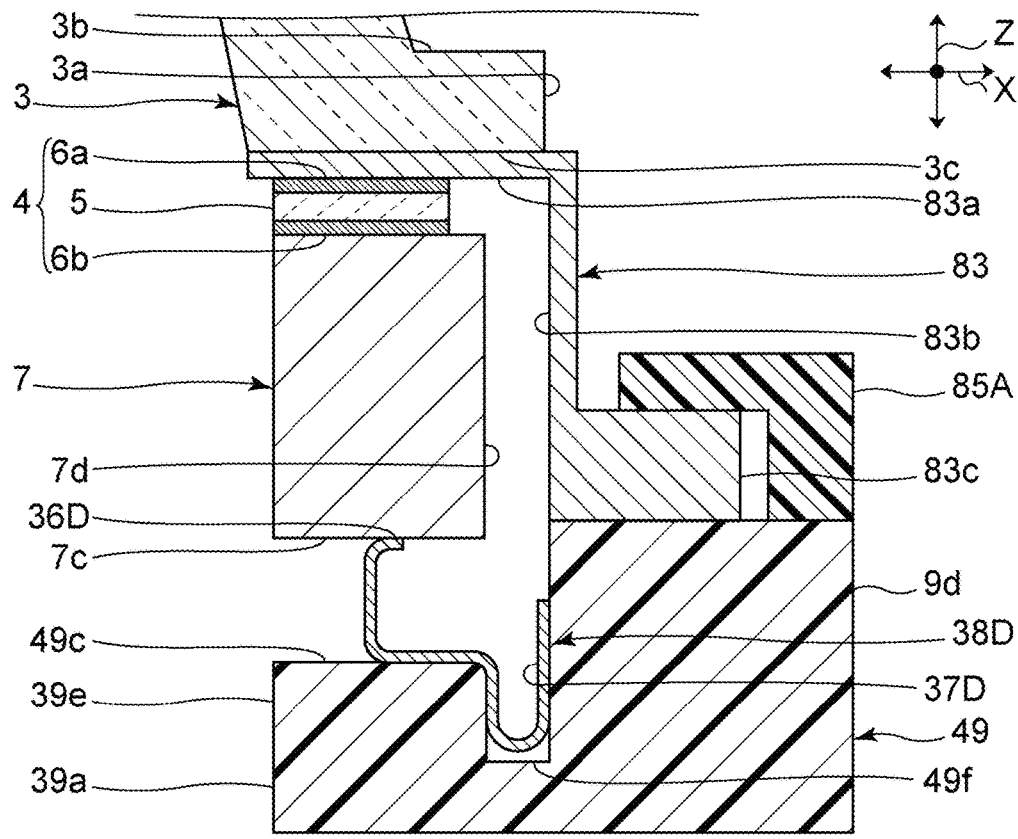
FIG. 24 is a schematic elevation sectional view illustrating a vicinity of an elastic member in a vibration device according to a modified example of the seventh preferred embodiment of the present invention.

Although the first bottom portion 83*c* of the first support body 83 and the case member 49 are directly connected to each other by an adhesive, screwing, or the like, for example, the present preferred embodiment is not limited thereto, and the first bottom portion 83*c* and the case member 49 may be indirectly connected to each other. In a modified example of the seventh preferred embodiment illustrated in FIG. 24, a fixing member 85A is provided on the side wall portion 9*d* of the case member 49, so as to grip the first bottom portion 83*c*, together with the case member 49. A section along the axial direction Z of the fixing member 85A has an L shape or a substantially L shape. The fixing member 85A can be fixed on the side wall portion 9*d* by, for example, screwing, or the like. In this manner, the first bottom portion 83*c* of the first support body 83 may be indirectly connected to the case member 49 by the fixing member 85A, or the like.

Figure 25:
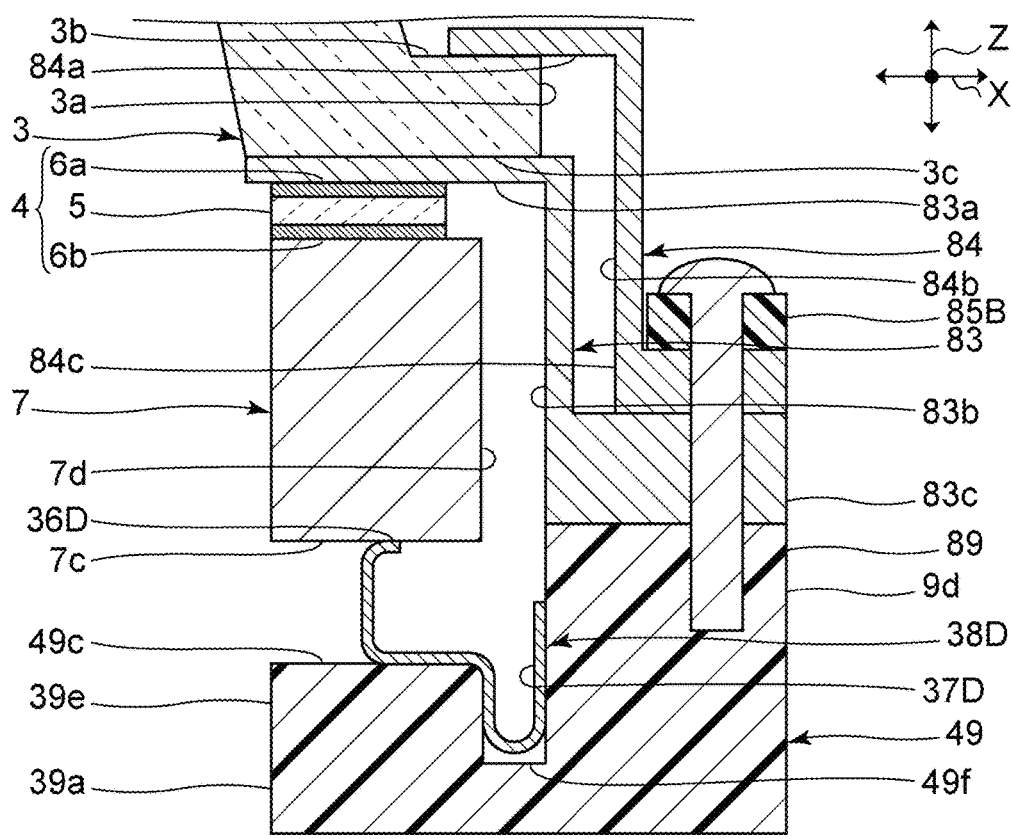
FIG. 25 is an enlarged schematic elevation sectional view of a vibration device according to an eighth preferred embodiment of the present invention.

FIG. 25 is an enlarged schematic elevation sectional view of a vibration device according to an eighth preferred embodiment of the present invention.

The present preferred embodiment is different from the seventh preferred embodiment in that a second support body 84 that extends in the axial direction Z and supports the vibrator 2 is provided, and that a fixing member 85B to fix the first support body 83 and the second support body 84 is provided. In other respects described above, the vibration device according to the present preferred embodiment has the same or similar configuration to that of the vibration device according to the seventh preferred embodiment.

The second support body 84 has a shape similar to that of the first support body 83. More specifically, the second support body 84 includes a fourth connection portion 84*a* connected to the first surface 3*b* in the flange portion 3*a* of the light-transmissive cover 3, and a second bottom portion 84*c* fixed to the first bottom portion 83*c* of the first support body 83. The second support body 84 includes a second coupling portion 84*b* extending in the axial direction Z, and coupling the fourth connection portion 84*a* and the second bottom portion 84*c* to each other. The fourth connection portion 84*a* is annular or substantially annular. The second coupling portion 84*b* and the second bottom portion 84*c* each have a cylindrical or substantially cylindrical shape extending in the axial direction Z. Note that, the shapes of the respective portions of the second support body 84 are not limited to the above. The second coupling portion 84*b* may have a frame shape other than an annular or substantially annular shape, for example. The second coupling portion 84*b* and the second bottom portion 84*c* may each have, for example, a rectangular or substantially rectangular cylindrical shape.

A section along the axial direction Z of the second support body 84 has an L or substantially L shape. More specifically, in the second support body 84, a radial thickness of the second bottom portion 84*c* is larger than a radial thickness of the second coupling portion 84*b*. Thus, the second coupling portion 84*b* is more easily deformed than the second bottom portion 84*c*, and a spring property is outstanding. Note that, the radial thickness of the second bottom portion 84*c* of the second support body 84 is increased from a side of the second coupling portion 84*b* toward an outside in the radial direction X.

In the present preferred embodiment, the second support body 84 is preferably made of suitable metal. Note that, the second support body 84 may be made of a suitable ceramic or the like, for example.

The second bottom portion 84*c* of the second support body 84 is provided on the first bottom portion 83*c* of the first support body 83. The fixing member 85B is provided on the second bottom portion 84*c*. The fixing member 85B is annular or substantially annular, and is made of suitable resin or the like, for example. Note that, the shape of the fixing member 85B is not limited to the above. The first bottom portion 83*c* and the second bottom portion 84*c* are fixed to the side wall portion 9*d* of the case member 49 from a side of the fixing member 85B by a screw 89.

In the second support body 84, vibration can be absorbed due to a spring property of the second coupling portion 84*b*. This makes the leakage of the vibration less likely to reach the second bottom portion 84*c*. Thus, leakage and damping of vibration to the case member 49 can be reduced or prevented, and the vibrator 2 can be supported more securely.

The vibrator 2 is, in addition to being held by the elastic member 38D and being supported by the first support body 83, supported by the second support body 84. Thus, it is possible to further reduce or prevent an influence of a stress applied to the vibrator 2, and it is possible to more efficiently vibrate the light-transmissive cover 3 to which water droplets or the like are attached. Further, durability against vibration shock can be effectively improved, and reliability can be effectively improved. In addition, since the flange portion 3*a* of the light-transmissive cover 3 is gripped by the first support body 83 and the second support body 84, the light-transmissive cover 3 is unlikely to fall off or detach from the vibrator 2. Thus, the reliability can be further improved.

In the present preferred embodiment, an optical detection element such as an imaging element is disposed in an internal space defined by the vibrator 2, the elastic member 38D, and the case member 49. Further, the piezoelectric element 4 of the vibrator 2 and the elastic member 38D are covered with the first support body 83, the light-transmissive cover 3 of the vibrator 2, and the case member 49. In addition, the first coupling portion 83b of the first support member 83 is covered with the second support body 34. Thus, waterproof performance can be further improved.

The configuration to fix the first support body 83 and the second support body 84 is not limited to the above. In the following, first and second modified examples of the eighth preferred embodiment will be described, that are different from the eighth preferred embodiment in a configuration to fix the first support body 83 and the second support body 84. In the first and second modified examples, as in the eighth preferred embodiment, an influence of a stress applied to a vibrator can be reduced or prevented, a light-transmissive cover to which water droplets or the like are attached can be efficiently vibrated, and the light-transmissive cover 3 is unlikely to fall off or detach from the vibrator 2.

Figure 26:
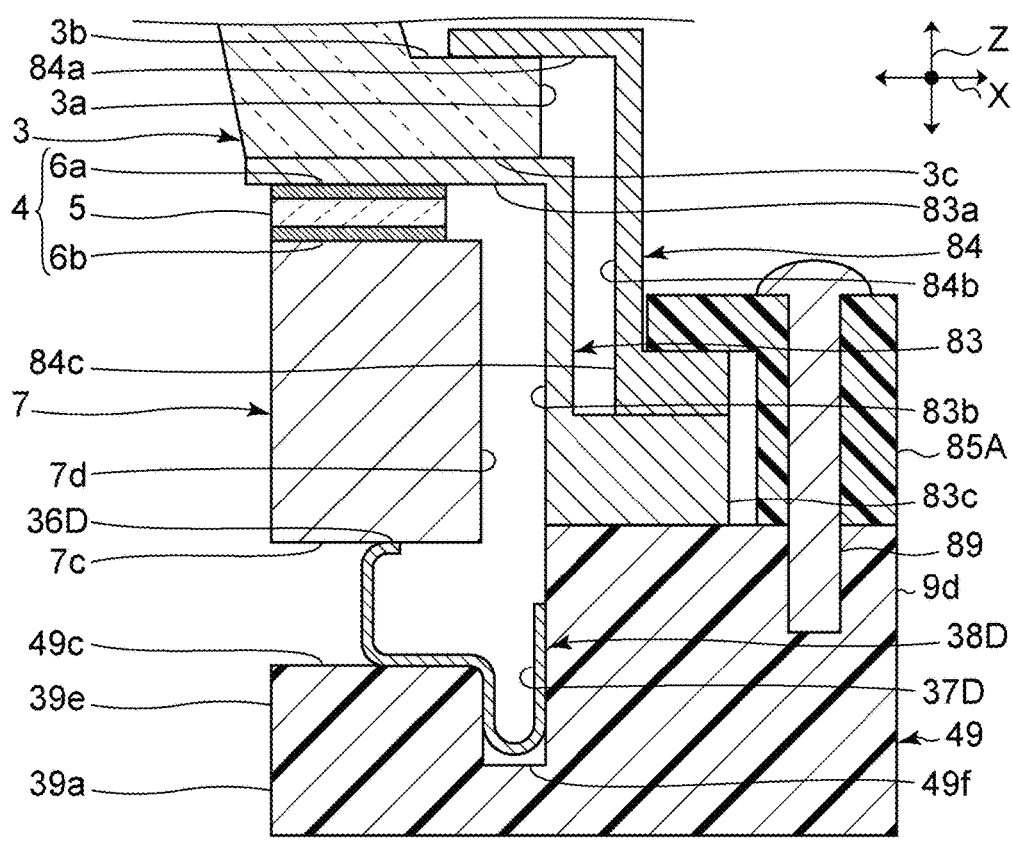
FIG. 26 is a schematic elevation sectional view illustrating a vicinity of a second support body in a vibration device according to a first modified example of the eighth preferred embodiment of the present invention.

As illustrated in FIG. 26, in the first modified example, the fixing member 85A as in the seventh preferred embodiment is provided. The fixing member 85A is disposed so as to grip, together with the case member 49, a portion where the first bottom portion 83c of the first support body 83 and the second bottom portion 84c of the second support body 84 are stacked. The fixing member 85A is fixed to the side wall portion 9d of the case member 49 by screwing. The first support body 83 and the second support body 84 are indirectly fixed to the case member 49 by the fixing member 85A.

Figure 27:
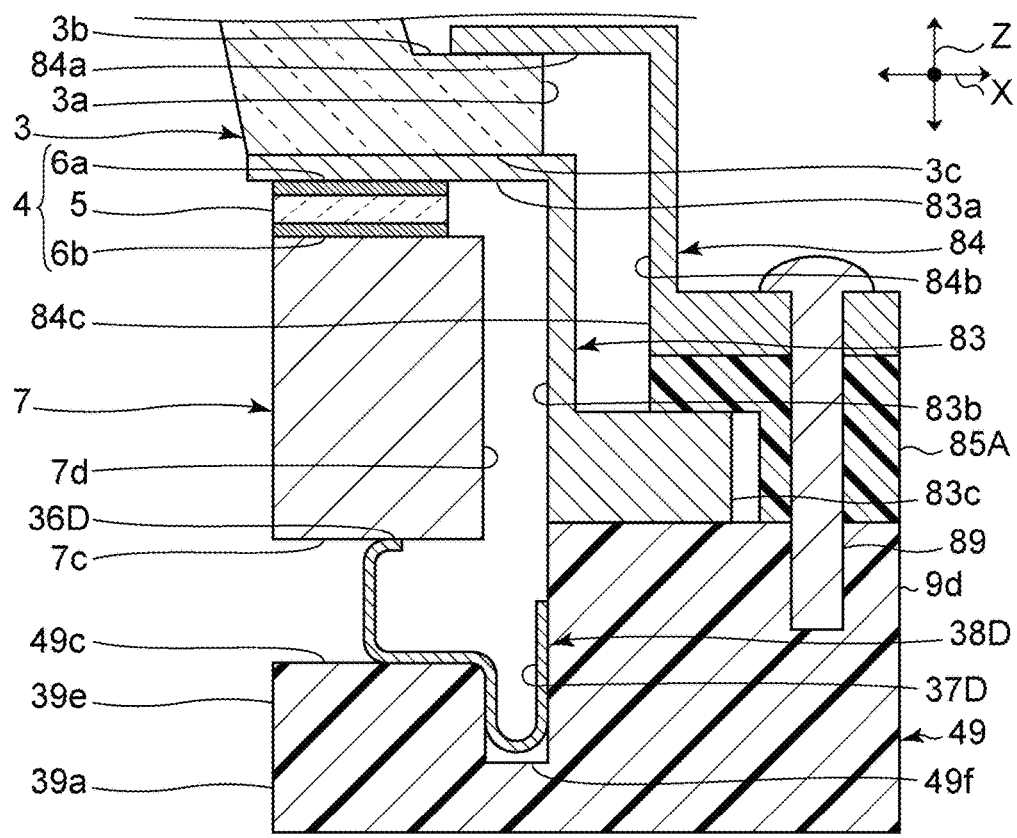
FIG. 27 is a schematic elevation sectional view illustrating a vicinity of a second support body in a vibration device according to a second modified example of the eighth preferred embodiment of the present invention.

As illustrated in FIG. 27, in the second modified example, the fixing member 85A as in the seventh preferred embodiment is provided. The fixing member 85A is disposed so as to grip, together with the case member 49, the first bottom portion 83c of the first support body 83. The fixing member 85A is fixed to the side wall portion 9d of the case member 49 by screwing. The first support body 83 is indirectly fixed to the case member 49 by using the fixing member 85A. The method for fixing the case member 49 and the fixing member 85A is not limited to the screwing. For example, fixing by welding, or by using other mechanical structure such as snap-fitting, may be used.

On the other hand, the second bottom portion 84c of the second support body 84 is provided on the fixing member 85A. The second bottom portion 84c is fixed to the case member 49 with the fixing member 85A interposed therebetween, by the screw 89 that fixes the fixing member 85A. The second support body 84 is also fixed to the first bottom portion 83c of the first support body 83 with the fixing member 85A interposed therebetween. In this manner, the fixing member 85A made of resin or the like is positioned between the first support body 83 and the second support body 84.

As described above, when the first support body 83 is made of metal, the first support body 83 is electrically connected to the piezoelectric element 4. On the other hand, in the present modified example, the first support body 83 and the second support body 84 are electrically insulated from each other by the fixing member 85A. Thus, the second support body 84 not electrically connected to the piezoelectric element 4 is positioned outermost with respect to the vibration device. Thus, safety can be more reliably improved.

In the eighth preferred embodiment, one second support body 84 is provided, the fourth connection portion 84a is frame-shaped, and the second coupling portion 84b and the second bottom portion 84c are each cylindrical or substantially cylindrical. Note that, the configuration of the second support body 84 is not limited thereto. In the following, third to sixth modified examples of the eighth preferred embodiment each having a different configuration of the second support body will be described. In the third to sixth modified examples, as in the eighth preferred embodiment, an influence of a stress applied to a vibrator can be reduced or prevented, a light-transmissive cover to which water droplets or the like are attached can be efficiently vibrated, and the light-transmissive cover 3 is unlikely to fall off or detach from the vibrator 2.

Figure 28:
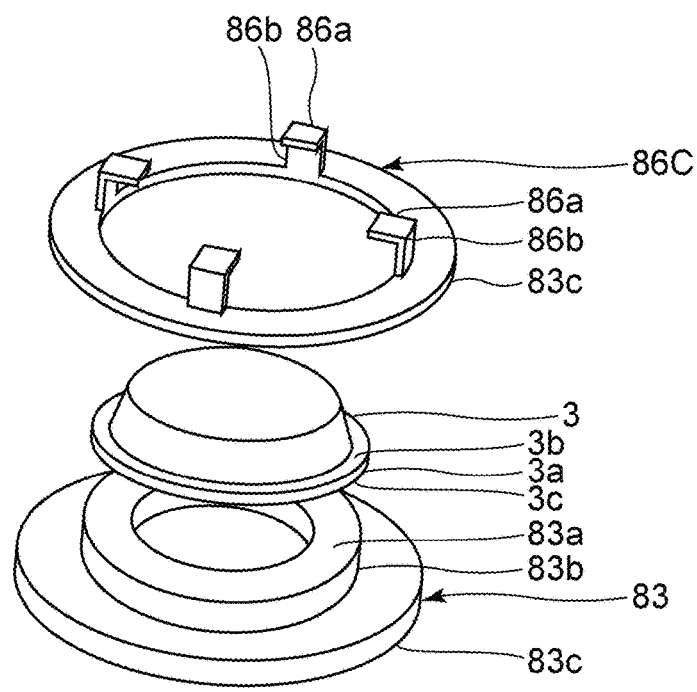
FIG. 28 is an exploded perspective view illustrating a first support body, a second support body, and a light-transmissive cover in a vibration device according to a third modified example of the eighth preferred embodiment of the present invention.

As illustrated in FIG. 28, in the third modified example, a second support body 86C includes a plurality of fourth connection portions 86a and a plurality of second coupling portions 86b disposed along a circumferential direction. Each of the fourth connection portions 86a and the second coupling portions 86b is has a rectangular or substantially rectangular plate shape. The plurality of second coupling portions 86b are connected to each other by the second bottom portion 84c.

In the present modified example, the second support body 86C supports a portion of the light-transmissive cover 3 in the circumferential direction. Thus, a vibration of the vibrator 2 is unlikely to be inhibited, and a vibration efficiency can be improved.

Figure 29:
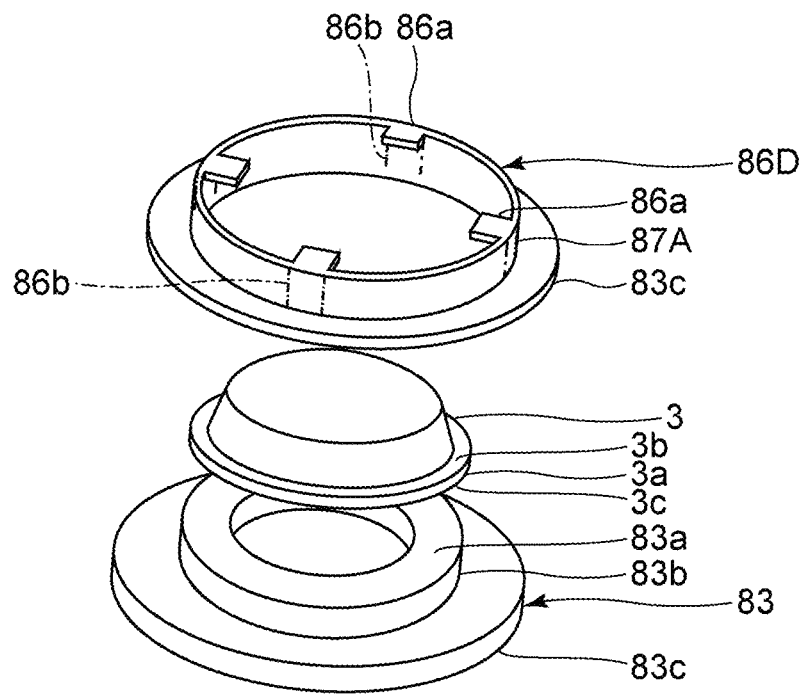
FIG. 29 is an exploded perspective view illustrating a first support body, a second support body, and a light-transmissive cover in a vibration device according to a fourth modified example of the eighth preferred embodiment of the present invention.

As illustrated in FIG. 29, in the fourth modified example, a second support body 86D includes, similarly to the third modified example, the plurality of fourth connection portions 86a and the plurality of second coupling portions 86b. The second support body 86D includes the plurality of second coupling portions 86b, and includes an outer wall portion 87A provided along the circumferential direction. A shape of the outer wall portion 87A of the present modified example is cylindrical or substantially cylindrical, similar to the shape of the second coupling portion 84b in the eighth preferred embodiment. Accordingly, when a configuration is adopted where the first support body 83 and the second support body 86D are electrically insulated from each other, safety can be more reliably improved, and a vibration of the vibrator 2 is unlikely to be inhibited.

Note that, the outer wall portion 87A may be provided with a cutout portion. In this case, even when foreign matter such as water, mud, or the like enters between the light-transmissive cover 3 and the second support body 86D, the water, mud, or the like, can be removed from the cutout portion.

Figure 30:
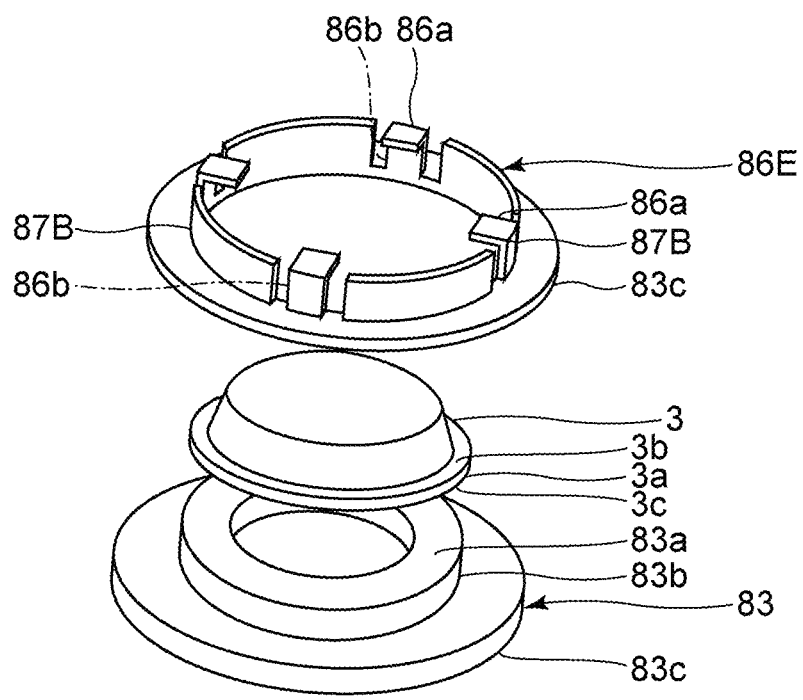
FIG. 30 is an exploded perspective view illustrating a first support body, a second support body, and a light-transmissive cover in a vibration device according to a fifth modified example of the eighth preferred embodiment of the present invention.

As illustrated in FIG. 30, in the fifth modified example, a second support body 86E includes, similarly to the third modified example, the plurality of fourth connection portions 86a and the plurality of second coupling portions 86b. The second support body 86E includes the plurality of second coupling portions 86b, and includes a plurality of outer wall portions 87B provided along a circumferential direction. Note that, in the present modified example, the outer wall portion 87B corresponding to the second coupling portion 86b and the outer wall portion 87B not including the second coupling portion 86b are provided. However, at least one outer wall portion 87B that includes the second coupling portion 86b and extends in the circumferential direction may be provided.

The outer wall portions 87B are connected to each other by the second bottom portion 84c, and are opposed to each other in the circumferential direction with respective gaps interposed therebetween. Thus, even when foreign matter such as water, mud, or the like enters between the light-transmissive cover 3 and the second support body 86E, the water, mud, or the like can be removed from the gap portion. In addition, as in the fourth modified example, safety can be more reliably improved, and a vibration of the vibrator 2 is unlikely to be inhibited.

Figure 31:
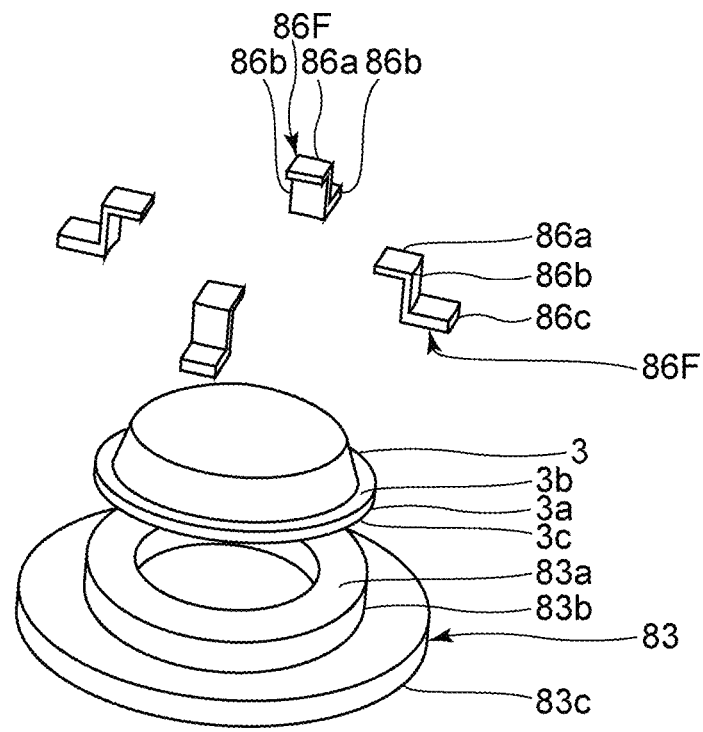
FIG. 31 is an exploded perspective view illustrating a first support body, a second support body, and a light-transmissive cover in a vibration device according to a sixth modified example of the eighth preferred embodiment of the present invention.

As illustrated in FIG. 31, in the sixth modified example, a plurality of second support bodies 86F is provided. Each of the second support bodies 86F includes the fourth connection portion 86a, the second coupling portion 86b, and a second bottom portion 86c. Similarly to the third modified example, the fourth connection portion 86a and the second coupling portion 86b each have a rectangular or substantially rectangular plate shape. The second bottom portion 86c has a rectangular or substantially rectangular parallelepiped shape.

Figure 32:
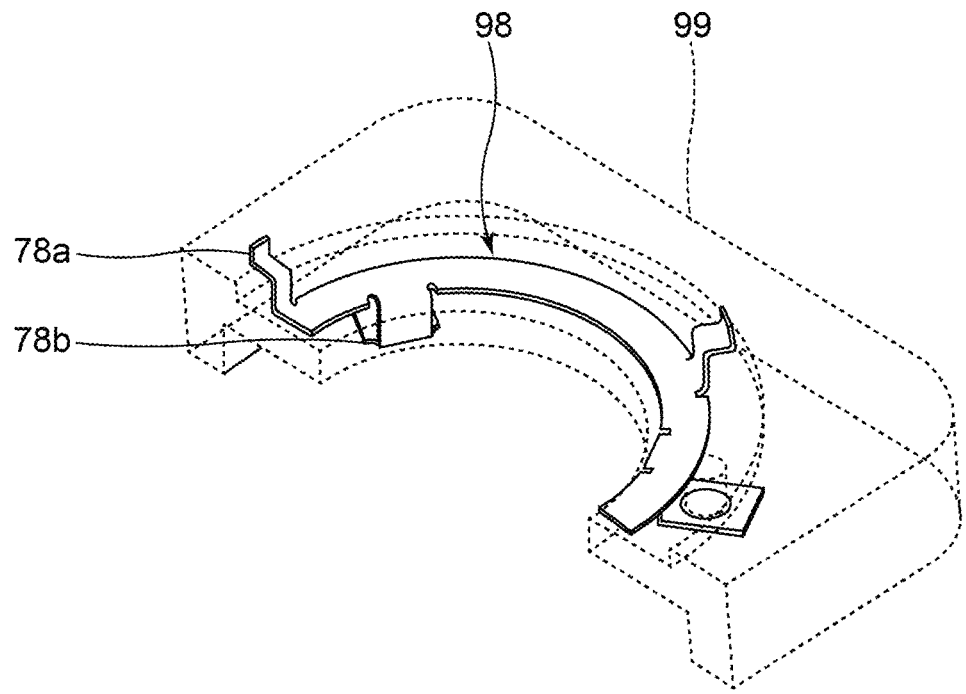
FIG. 32 is a schematic sectional view illustrating an elastic member and a case member of a vibration device according to a ninth preferred embodiment of the present invention.
Figure 33:
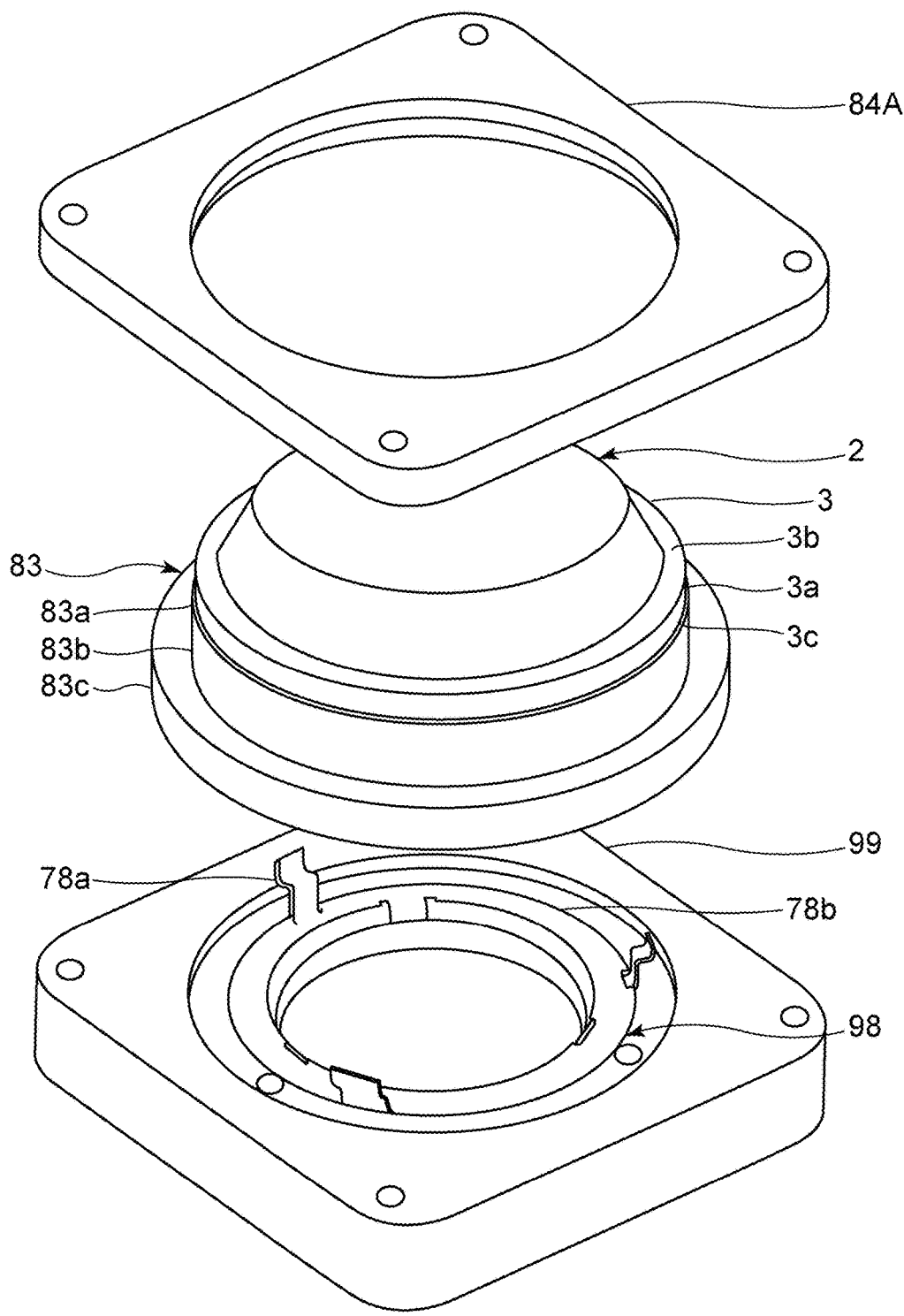
FIG. 33 is an exploded perspective view illustrating the vibration device according to the ninth preferred embodiment of the present invention.

FIG. 32 is an exploded perspective view illustrating a vibration device according to a ninth preferred embodiment of the present invention. FIG. 33 is a schematic sectional view illustrating an elastic member and a case member of a vibration device according to the ninth preferred embodiment.

As illustrated in FIG. 32 and FIG. 33, the present preferred embodiment is different from the sixth preferred embodiment in that an elastic member 98 and a case member 99 are insert molded bodies. The present preferred embodiment is also different from the sixth preferred embodiment in that the first support body 83 is connected to the case member 49 by the fixing member 85A, as in the modified example of the seventh preferred embodiment illustrated in FIG. 24, and different in an arrangement of the spring portion 78a and the second connection portion 57. In other respects described above, the vibration device according to the present preferred embodiment has the same or similar configuration to the vibration device of the sixth preferred embodiment.

In the elastic member 98, the three spring portions 78a and the three second connection portions 57 are disposed so as to be 3-fold rotationally symmetric, respectively. The second connection portion 57 is insert molded so as to be positioned inside the case member 99. In this way, since the elastic member 98 and the case member 99 are integrated as an insert molded body, the configuration of the vibration device can be simplified. Thus, productivity can be improved. In addition, as in the sixth preferred embodiment, it is possible to reduce or prevent an influence of a stress applied to the vibrator 2, and to effectively vibrate the light-transmissive cover 3 to which water droplets or the like are attached.

Figure 34:
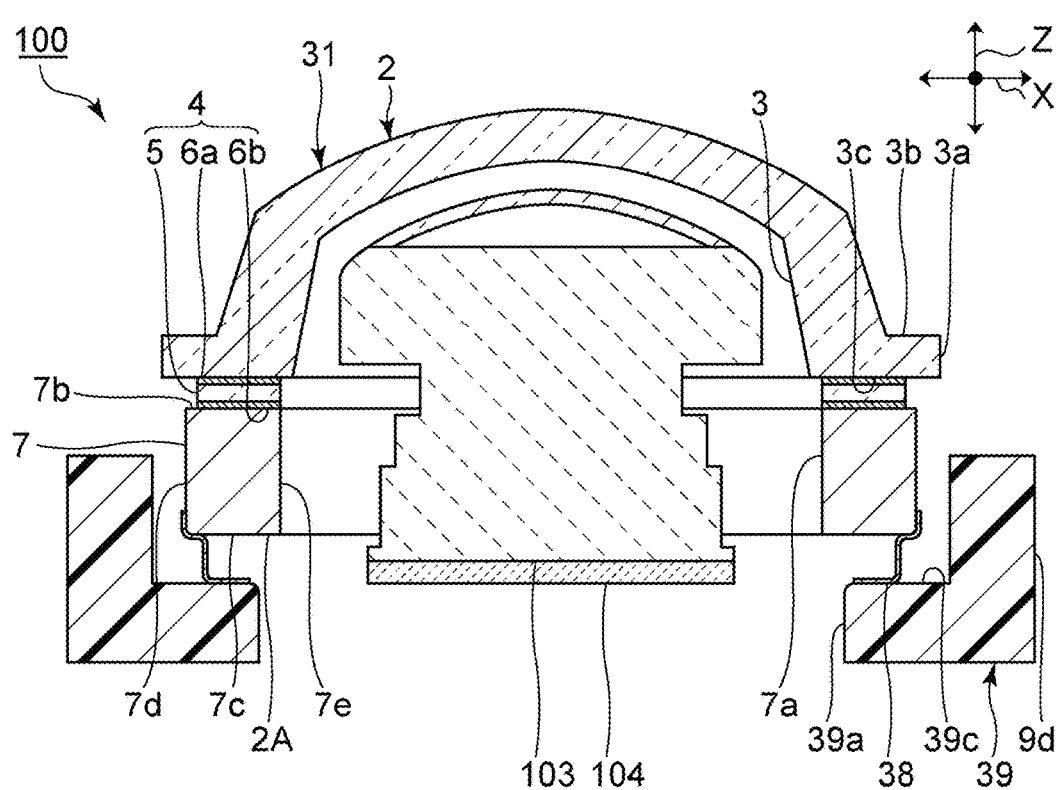
FIG. 34 is a schematic elevation sectional view of an imaging device according to a tenth preferred embodiment of the present invention.

FIG. 34 is a schematic elevation sectional view of an imaging device according to a tenth preferred embodiment of the present invention.

An imaging device 100 as an example of an optical detection device includes the vibration device 31 according to the third preferred embodiment, and an imaging element 103. The imaging element 103 is disposed in an internal space of the vibration device 31 defined by the vibrator 2, the elastic member 38, and the case member 39. Note that, although not illustrated in the figure, the imaging element 103 can be supported by an appropriate member or the like.

A circuit board 104 is provided in the internal space. Although an arrangement of the circuit board 104 is not particularly limited, in the present preferred embodiment, the circuit board 104 is provided on a portion on a side of the bottom plate portion 39c of the case member 39 in the imaging element 103. The circuit board 104 includes a piezoelectric element control circuit to drive the piezoelectric element 4 in a resonance state or the like, and an imaging element control circuit to drive the imaging element 103. The imaging device 100 may include a heater to heat the vibrator 2. Thus, moisture can be efficiently removed. In this case, the circuit board 104 may include a heater control circuit to drive the heater.

Note that, the vibration device 31 or the imaging device 100 may not necessarily include the circuit board 104. When the circuit board 104 is not provided, it is sufficient that the imaging element 103 and the piezoelectric element 4 are controlled by signals from an outside.

Examples of the imaging element 103 include, for example, a CMOS, a CCD, a bolometer, a thermopile, and the like, to receive light of a wave length in any from a visible region to a far infrared region. Examples of the imaging device 100 include, for example, a camera, a radar, a LIDAR device, and the like.

Note that, an optical detection element to optically detect an energy ray, other than the imaging element 103 may be disposed in the internal space of the vibration device 31. An energy ray to be detected may be, for example, an active energy ray such as an electromagnetic wave, an infrared ray, or the like. A detection region of the optical detection element is included in the light-transmissive cover 3. In the imaging device 100, a field of view of the imaging element 103 as the detection region is included in the light-transmissive cover 3.

Since the imaging device 100 includes the vibration device 31 according to the third preferred embodiment, it is possible to reduce or prevent an influence of a stress applied to the vibrator 2, and it is possible to effectively vibrate the light-transmissive cover 3 to which water droplets or the like are attached.

In the present preferred embodiment, although the example using the vibration device 31 according to the third preferred embodiment has been described, the vibration devices according to any of the first, second, and fourth to ninth preferred embodiments of the present may be used for imaging devices. For example, when the vibration device according to the ninth preferred embodiment is used, the light-transmissive cover 3 can be efficiently vibrated, and additionally, productivity can be improved, and further, the reduction in size can be achieved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device comprising:
   a vibrator including a cylinder including an opening, a light-transmissive cover directly or indirectly coupled to the cylinder so as to cover the opening of the cylinder, and a piezoelectric element to vibrate the light-transmissive cover, and including an opening end portion;
   an elastic member holding the opening end portion of the vibrator; and
   a case connected to the elastic member; wherein
   the vibration device is configured such that the light-transmissive cover, the cylinder, the opening end portion, the elastic member, and the case are disposed in that order along a direction in which the cylinder extends.

2. The vibration device according to claim 1, wherein an elastic modulus of the elastic member is larger than an elastic modulus of the cylinder.

3. The vibration device according to claim 1, wherein
the piezoelectric element is provided between the light-transmissive cover and the cylinder; and
the opening end portion of the vibrator is an opening end portion of the cylinder.

4. The vibration device according to claim 1, wherein the elastic member has a sheet shape.

5. The vibration device according to claim 1, wherein the elastic member includes a leaf spring including a first connection portion connected to the vibrator, and a second connection portion connected to the case.

6. The vibration device according to claim 5, wherein
a first groove portion is provided in the opening end portion of the vibrator; and
the first connection portion of the elastic member is connected to an inside of the first groove portion.

7. The vibration device according to claim 5, wherein
the vibrator includes an opening end surface, and an outer surface and an inner surface that are connected to the opening end surface;
the opening end portion includes the opening end surface, and a portion in a vicinity of the opening end surface of each of the outer surface and the inner surface; and
the first connection portion of the elastic member is at least connected to the opening end surface.

8. The vibration device according to claim 7, wherein the first connection portion of the elastic member is connected to one of the outer surface and the inner surface.

9. The vibration device according to claim 5, wherein
the case includes a side wall portion, and includes a holding portion extending inward from the side wall portion, connected to the elastic member, and holding the vibrator with the elastic member interposed between the holding member and the vibrator; and
the holding portion of the case includes a first surface positioned on a side closer to the vibrator, a second surface that is on an opposite side of the first surface, and a side surface connecting the first surface and the second surface to each other.

10. The vibration device according to claim 9, wherein the second connection portion of the elastic member is connected to the side surface and the second surface of the holding portion of the case.

11. The vibration device according to claim 9, wherein
the side surface of the holding portion of the case include a step portion;
the elastic member is connected to the side surface of the holding portion, and the second connection portion of the elastic member abuts on the step portion; and
the elastic member includes a portion opposed to the first surface of the holding portion with a gap between the portion of the elastic member opposed to the first surface and the first surface of the holding portion.

12. The vibration device according to claim 9, wherein
the second connection portion of the elastic member is connected to the second surface of the holding portion; and
the elastic member includes a portion opposed to the first surface of the holding portion with a gap between the portion of the elastic member opposed to the first surface and the first surface of the holding portion, and a portion opposed to the side surface with a gap between the portion of the elastic member opposed to the side surface and the side surface of the holding portion.

13. The vibration device according to claim 5, wherein
the case includes a second groove portion; and
the second connection portion of the elastic member is connected to an inside of the second groove portion.

14. The vibration device according to claim 5, wherein
when a direction in which the cylinder extends is defined as an axial direction, the elastic member includes:
a plurality of spring portions disposed along a circumferential direction about an axis extending in the axial direction; and
a frame-shaped portion connecting the plurality of spring portions to each other.

15. The vibration device according to claim 5, further comprising, when a direction in which the cylinder extends is defined as an axial direction, a plurality of elastic members disposed along a circumferential direction about an axis extending in the axial direction; wherein
each of the plurality of elastic members hold the opening end portion of the vibrator.

16. The vibration device according to claim 1, further comprising:
when a direction in which the cylinder extends is defined as an axial direction, a first support body extending in the axial direction and supporting the vibrator; wherein
the first support body includes a third connection portion connected between the cylinder and the light-transmissive cover, a first bottom portion connected to the case, and a first coupling portion extending in the axial direction and coupling the third connection portion and the first bottom portion to each other;
when a thickness along a direction orthogonal or substantially orthogonal to the axial direction is defined as a radial thickness, in the first support body, a radial thickness of the first bottom portion is larger than a radial thickness of the first coupling portion.

17. The vibration device according to claim 16, wherein
the piezoelectric element is provided between the cylinder and the light-transmissive cover;
the third connection portion of the first support body is connected to the piezoelectric element; and
the first support body is made of metal.

18. The vibration device according to claim 16, further comprising:
a second support body extending in the axial direction, and supporting the vibrator; wherein
the light-transmissive cover includes a flange portion positioned on a side closer to the cylinder;
the second support body includes a fourth connection portion connected to the flange portion of the light-transmissive cover, a second bottom portion directly or indirectly connected to the first bottom portion of the first support body, and a second coupling portion extending in the axial direction, and coupling the fourth connection portion and the second bottom portion to each other; and
in the second support body, a radial thickness of the second bottom portion is larger than a radial thickness of the second coupling portion.

19. The vibration device according to claim 18, wherein
the second bottom portion of the second support body is cylindrical or substantially cylindrical; and
the second support body includes a plurality of fourth connection portions and a plurality of second coupling portions disposed along a circumferential direction about an axis extending in the axial direction, each of the plurality of fourth connection portions being connected to the flange portion of the light-transmissive cover, each of the plurality of second coupling portions extending in the axial direction, and coupling each of the fourth connection portions and the second bottom portion to each other.

20. The vibration device according to claim 19, wherein the second support body includes at least one outer wall portion including the plurality of second coupling portions and being provided along the circumferential direction.

21. The vibration device according to claim 20, wherein the outer wall portion of the second support body has a cylindrical or substantially cylindrical shape.

22. The vibration device according to claim 20, wherein the second support body includes a plurality of the outer wall portions disposed along the circumferential direction.

23. The vibration device according to claim 1, wherein the cylinder is made of metal.

24. The vibration device according to claim 1, wherein the cylinder is made of a ceramic.

25. An optical detection device, comprising:
the vibration device according to claim 1; and
an optical detection element disposed so that a detection region is included in the light-transmissive cover.

26. The optical detection device according to claim 25, wherein the optical detection element is an imaging element, and the detection region is a field of view.

27. A vibration device comprising:
a vibrator including a cylinder including an opening, a light-transmissive cover directly or indirectly coupled to the cylinder so as to cover the opening of the cylinder, and a piezoelectric element to vibrate the light-transmissive cover, and including an opening end portion; and
a case including a projecting portion holding the opening end portion of the vibrator; wherein
the vibration device is configured such that the light-transmissive cover, the cylinder, the opening end portion, the projecting portion, and the case are disposed in that order along a direction in which the cylinder extends.

* * * * *